United States Patent
Kopylovitz et al.

(10) Patent No.: US 8,938,582 B2
(45) Date of Patent: Jan. 20, 2015

(54) STORAGE SYSTEMS WITH REDUCED ENERGY CONSUMPTION

(75) Inventors: Haim Kopylovitz, Herzliya (IL); Leo Corry, Ramat Gan (IL)

(73) Assignee: Infinidat Ltd., Herzliya (IL)

( * ) Notice: Subject to any disclaimer, the term of this patent is extended or adjusted under 35 U.S.C. 154(b) by 601 days.

(21) Appl. No.: 13/173,941

(22) Filed: Jun. 30, 2011

(65) Prior Publication Data
US 2012/0011313 A1    Jan. 12, 2012

Related U.S. Application Data

(60) Provisional application No. 61/360,660, filed on Jul. 1, 2010.

(51) Int. Cl.
G06F 13/00    (2006.01)
G06F 13/28    (2006.01)
G06F 3/06    (2006.01)
G06F 12/08    (2006.01)

(52) U.S. Cl.
CPC .......... *G06F 3/0625* (2013.01); *G06F 12/0866* (2013.01); *G06F 3/064* (2013.01); *G06F 3/0689* (2013.01); *G06F 2212/262* (2013.01); *Y02B 60/1225* (2013.01); *Y02B 60/1246* (2013.01)
USPC .................... 711/114; 711/113; 711/E12.103

(58) Field of Classification Search
None
See application file for complete search history.

(56) References Cited

U.S. PATENT DOCUMENTS 7,302,539 B2 * 11/2007 Korgaonkar et al. ......... 711/162
8,006,111 B1 * 8/2011 Faibish et al. ................. 713/324
8,285,948 B2 * 10/2012 Elliott et al. .................. 711/154
8,566,549 B1 * 10/2013 Burke et al. .................. 711/168
2005/0144486 A1 * 6/2005 Komarla et al. .............. 713/300
2006/0107099 A1    5/2006 Pinheiro et al.
2009/0129193 A1    5/2009 Joshi et al.

(Continued)

OTHER PUBLICATIONS

Li, D. and Wang, J. 2004. "EERAID: Energy Efficient. . . ," In Proceed of the 11th Workshop on ACM SIGOPS European Workshop (Leuven, Belgium, Sep. 19-22, 2004) EW 11 AC NY, NY 29.

(Continued)

*Primary Examiner* — Eric S Cardwell
(74) *Attorney, Agent, or Firm* — Oren Reches

(57) ABSTRACT

Storage systems with reduced energy consumption, methods of operating thereof, corresponding computer program products and corresponding program storage devices. Some non-limiting examples of a write method include: configuring a plurality of storage disk units such that at any given point in time there are at least two storage disk drives operating in active state in any storage disk unit; caching in a cache memory one or more write requests and generating a consolidated write request corresponding to a stripe in a RAID group; destaging the consolidated write request; and writing the destaged consolidated write request in a write out of place manner to one or more storage disk drives operating at the destage point of time in active state. Some non-limiting examples of a read method include: configuring local storage disk drives so that at any given point in time, a part of the local storage disk drives operates in low power state, wherein the local storage disk drives are operable to switch between low power state and active state; and responsive to a read request for a portion on a local storage disk drive, reading from the local storage disk drive, if active; and if the local storage disk drive is not active, enquiring if a remote mirror storage disk drive storing a copy of the portion is active, and if yes, reading from the remote mirror storage disk drive.

18 Claims, 10 Drawing Sheets

(56) References Cited

U.S. PATENT DOCUMENTS

| | | | |
|---|---|---|---|
| 2009/0249001 A1 | 10/2009 | Narayanan | |
| 2010/0027147 A1* | 2/2010 | Subramanian et al. | 360/15 |
| 2011/0082997 A1 | 4/2011 | Yochai et al. | |
| 2011/0202722 A1 | 8/2011 | Satran | |

OTHER PUBLICATIONS

Weddle, C., Oldham, M., Qian, J., Wang, A. A., Reiher, P., and Kuenning, G. 2007. "PARAID: A Gear-Shifting Power-Aware RAID," Trans. Storage 3, 3 (Oct. 2007),13.

Yao, X. and Wang, J. 2006. "RIMAC: A Novel Redundancy-based Hierarchical Cache Architecture for Energy Efficient, High . . . " SIGOPS Oper Syst Rev 40, Oct. 2006, 249-262.

Pinheiro, E. and Bianchini, R. 2004, "Energy Conservation Techniques. . . ," In Proceed of the 18th Annual Intl. . . (Malo, France, Jun. 26-Jul. 1, 2004). ICS '04. ACM NY, NY 1-10.

Allalouf, M., Arbitman, Y., Factor, M., Kat, R. I., Meth, K., and Naor, D. 2009. "Storage Modeling for Power Estimation. . . ," Haifa, Israel. Systor '09. ACM, New York, NY 1-10.

S. Gurumurthi, A. Sivasubramaniam, M. Kandemir, and H. Franke, "DRPM: Dynamic Speed Control for Power Management in Server Class Disks," Proceedings of Int'l. . . (Jun. 2003).

Q. Zhu, A. Shankar, and Y Zhou "PB-LRU: A Self-Tuning Power Aware Storage Cache Replacement Algorithm for Conserving Disk Energy," Proceedings of 18th Int'l . . . (Jun. 2004).

Colarelli, D., Grunwald, D. and Neufeld, M. "The Case for Massive Array of Idle Disks (MAID)." Dept of Computer Science, University of CO, Boulder Jan. 7, 2002.

\* cited by examiner

STORAGE SYSTEMS WITH REDUCED ENERGY CONSUMPTION

CROSS-REFERENCE TO RELATED APPLICATIONS

This application claims the benefit of U.S. Provisional application No. 61/360,660 filed Jul. 1, 2010, which is hereby incorporated by reference herein in its entirety.

FIELD OF THE PRESENTLY DISCLOSED SUBJECT MATTER

The presently disclosed subject matter relates to data storage systems and to methods of operating thereof.

BACKGROUND OF THE PRESENTLY DISCLOSED SUBJECT MATTER

One of the current trends of development in the storage industry relates to methods and strategies for reduced energy consumption. Data centers can comprise nowadays dozens of storage systems, each comprising hundreds of disk drives. Clearly, most of the data stored in these systems is not in use for long periods of time, and hence most of the disk drives are likely to contain data that is not accessed for long periods of time. Power is unnecessarily spent in keeping all these disk drives spinning and, moreover, in cooling the data centers. Thus, efforts are now being invested in reducing energy-related spending for storage systems. Moreover, environmental regulations are increasingly being enforced in many countries, forcing data centers to adopt "green" technologies for its servers and storage systems.

One obvious way to address the increasing need for reduced energy consumption in storage systems is to manufacture servers and disk drives with reduced levels of energy consumption in normal usage. Vendors are indeed working in this direction, but this issue stands on its own, independent of the question of how the disk drives are used in the storage system, and the question of whether these systems can be designed in a way that reduces energy consumption regardless of the drives being used. Some basic strategies have been developed for regulating energy use within the system, based on the possibility of transitioning the drives to a low-power state when they are not in use, and restoring the normal, or "active" state whenever needed. The disk drive referred to hereinafter as "in low-power state" or "in low power mode" can be adapted to have reduced number of revolutions per minutes (RPM) or can be turned off. Turning the disk drive off can comprise either making it idle (in which case not only does the disk drive not rotate, but also the electronic does not respond), also called "sleep" state, or stopping the rotation but having the electronic respond (also called "stand by" in the industry). Each of these low-power state options has advantages and disadvantages well-known in the art in terms of energy saving, time to return to active state, and wear-off produced by the change in state.

The problems of reduced energy consumption in mass data storage systems have been recognized in the art and various techniques have been proposed as solutions including inter-alia:

US Patent Application No. 2006/0107099 (Pinheiro et al) discloses a redundant storage system comprising: a plurality of storage disks divided into a first subset, wherein all of the plurality of storage disks are dynamically assigned between the first and second subset based on redundancy requirements and system load; a module which diverts read requests to the first subset of storage disks in the redundant storage system, so that the second subset of storage disks in the redundant storage system can transition to a lower power mode until a second subset of storage disks is needed to satisfy a write request; a detection module which detects if the system load in the redundant storage system is high and detects if the system load in the redundant storage system is low; and a module which, if the system load is high, adds one or more storage disks from the second subset to the first subset of storage disks in the redundant storage system so as to handle the system load and if the system load is low, adds one or more storage disks from the first subset to the second subset.

US Patent application No. 2009/129193 (Joshi et al.) discloses an energy efficient storage device using per-element selectable power supply voltages. The storage device is partitioned into multiple elements, which may be sub-arrays, rows, columns or individual storage cells. Each element has a corresponding virtual power supply rail that is provided with a selectable power supply voltage. The power supply voltage provided to the virtual power supply rail for an element is set to the minimum power supply voltage unless a higher power supply voltage is required for the element to meet performance requirements. A control cell may be provided within each element that provides a control signal that selects the power supply voltage supplied to the corresponding virtual power supply rail. The state of the cell may be set via a fuse or mask, or values may be loaded into the control cells at initialization of the storage device.

US Patent application No. 2009/249001 (Narayanan et al.) discloses storage systems which use write off-loading. When a request to store some data in a particular storage location is received, if the particular storage location is unavailable, the data is stored in an alternative location. In an embodiment, the particular storage location may be unavailable because it is powered down or because it is overloaded. The data stored in the alternative location may be subsequently recovered and written to the particular storage location once it becomes available.

US Patent application No. 2010/027147 (Subramaniar et al.) discloses a low power consumption storage array. Read and write cycles are separated so that a multiple disk array can be spun down during periods when there are no write requests. Cooling fans are operated with a pulse-width modulated signal in response to cooling demand to further reduce energy consumption.

SUMMARY

In accordance with certain aspects of the presently disclosed subject matter, there is provided a method of operating a RAID protected storage system which includes a control layer, the control layer including a cache memory and the control layer operatively coupled to a physical storage space including a plurality of storage disk units which each includes a plurality of storage disk drives, the method comprising: configuring the plurality of storage disk units such that at any given point in time there are at least two storage disk drives operating in active state in any storage disk unit; caching in the cache memory one or more write requests and generating a consolidated write request corresponding to a stripe in a RAID group; destaging the consolidated write request; and writing the destaged consolidated write request in a write out of place manner to one or more storage disk drives operating at the destage point of time in active state.

In some of these aspects, prior to destaging the consolidated write request, the method can further comprise: dynamically assigning to each group member of the RAID group a storage disk unit; and for each assigned storage disk unit, associating each group member assigned to the disk unit with a disk partition in a different storage disk drive operating in active state; wherein the writing of the destaged consolidated write request is to physical addresses corresponding to the disk partitions.

Additionally or alternatively, in some of these aspects, responsive to a read request for a portion on a storage disk drive, the method can further comprise: reading from the storage disk drive.

Additionally or alternatively, in some of these aspects, the control layer can comprise at least two interconnected virtualization layers: a first virtual layer operative to represent logical units available to the clients and characterized by an Virtual Unit Space (VUS) and a second virtual layer operative to represent physical storage space available to the clients and characterized by a Virtual Disk Space (VDS); wherein the generating a consolidated write request is provided with the help of translation of VUS addresses into sequential VDS addresses, the VDS addresses representing a stripe associated with the RAID group.

Additionally or alternatively, in some of these aspects, a ratio between the disk drives operating in active state and the disk drives operating in low-power state in the same disk unit does not exceed a predefined parameter.

Additionally or alternatively, in some of these aspects the stripe can comprise data portions whose logical addresses are not all sequential.

Additionally or alternatively, in some of these aspects, where the control layer and physical storage space are included in a local storage system, the method can further comprise: transmitting the one or more write requests to a remote mirror storage system. In some cases of these aspects, the method can further comprise: responsive to a read request for a portion on a local storage disk drive, reading from the local storage disk drive, if active; if the local disk drive is not active, then enquiring from the remote mirror storage system whether a remote disk drive which stores a copy of the portion is active; and if the remote disk drive is active, then reading from the remote disk drive.

In accordance with further aspects of the presently disclosed subject matter, there is provided a RAID protected storage system, comprising: a physical storage space including a plurality of storage disk units which each include a plurality of storage disk drives; a control layer including a cache memory, operatively coupled to the physical storage space, the control layer operable to: configure the plurality of storage disk units such that at any given point in time there are at least two storage disk drives operating in active state in any storage disk unit, cache one or more write requests and generate a consolidated write request corresponding to a stripe in a RAID group; destage the consolidated write request; and write in a write out of place manner the destaged consolidated write request to one or more storage disk drives operating at the destage point of time in active state.

In some of these aspects, prior to destaging the consolidated write request, the control layer can be operable to: dynamically assign to each group member of the RAID group a storage disk unit; and for each assigned disk unit, associate each group member assigned to the storage disk unit with a disk partition in a different storage disk drive operating in active state; wherein the destaged consolidated write request is written to physical addresses corresponding to the disk partitions.

Additionally or alternatively, in some of these aspects, responsive to a read request for a portion on a storage disk drive, the control layer can be operable to read from the storage disk drive.

Additionally or alternatively, in some of these aspects, the control layer can comprise at least two interconnected virtualization layers: a first virtual layer operative to represent logical units available to the clients and characterized by a Virtual Unit Space (VUS) and a second virtual layer operative to represent physical storage space available to the clients and characterized by a Virtual Disk Space (VDS); and wherein the generation of the consolidated write request is provided with the help of translation of VUS addresses into sequential VDS addresses, the VDS addresses representing a stripe associated with the RAID group.

Additionally or alternatively, in some of these aspects, a ratio between the disk drives operating in active state and the disk drives operating in low-power state in the same disk unit does not exceed a predefined parameter.

Additionally or alternatively, in some of these aspects, the stripe can comprise data portions whose logical addresses are not all sequential.

Additionally or alternatively, in some of these aspects, where the control layer and physical storage space are included in a local storage system, the control layer can be further operable to transmit the one or more write requests to a remote mirror storage system. In some cases of these aspects, the control layer can be further operable to: responsive to a read request for a portion on a local storage disk drive, read from the local storage disk drive, if active; if the local disk drive is not active, enquire from the remote mirror storage system whether a remote disk drive which stores a copy of the portion is active; and if the remote disk drive is active, read from the remote disk drive.

In accordance with further aspects of the presently disclosed subject matter, there is provided a method of operating a system comprising a plurality of local storage disk drives which are remotely mirrored by a plurality of remote mirror storage disk drives, the method comprising: configuring the local storage disk drives so that at any given point in time, a part of the local storage disk drives operates in low power state, wherein the local storage disk drives are operable to switch between low power state and active state; and responsive to a read request for a portion on a local storage disk drive, reading from the local storage disk drive, if active; and if the local storage disk drive is not active, enquiring if a remote mirror storage disk drive storing a copy of the portion is active, and if yes, reading from the remote mirror storage disk drive.

In some of these aspects, the method can further comprise: caching in a cache memory one or more write requests and generating a consolidated write request corresponding to a stripe in a RAID group; transmitting the one or more write requests to a remote mirror storage system which includes the remote mirror storage disk drives; destaging the consolidated write request; and writing the destaged consolidated write request in a write out of place manner to one or more local storage disk drives operating at the destage point of time in active state.

In accordance with further aspects of the presently disclosed subject matter, there is provided a system comprising: a local storage system including: a physical storage space including a plurality of local storage disk drives; and a control layer operatively coupled to the physical storage space; and a remote mirror storage system; wherein the control layer is operable to: configure the local storage disk drives so that at any given point in time, a part of the local storage disk drives operates in low power state, wherein the local storage disk drives are operable to switch between low power state and active state; and responsive to a read request for a portion on a local storage disk drive, read from the local storage disk drive, if active; and if the local storage disk drive is not active, enquire if a remote mirror storage disk drive storing a copy of the portion is active, and if yes, read from the remote mirror storage disk drive.

In some of these aspects the control layer can be further operable to: cache in a cache memory one or more write requests and generate a consolidated write request corresponding to a stripe in a RAID group; transmit the one or more write requests to a remote mirror storage system which includes the remote mirror storage disk drives; destage the consolidated write request; and write the destaged consolidated write request in a write out of place manner to one or more local storage disk drives operating at the destage point of time in active state.

In accordance with further aspects of the presently disclosed subject matter, there is provided a program storage device readable by machine, tangibly embodying a program of instructions executable by the machine to perform a method of operating a RAID protected storage system which includes a control layer, the control layer including a cache memory and the control layer operatively coupled to a physical storage space including a plurality of storage disk units which each includes a plurality of storage disk drives, the method comprising: configuring the plurality of storage disk units such that at any given point in time there are at least two storage disk drives operating in active state in any storage disk unit; caching in the cache memory one or more write requests and generating a consolidated write request corresponding to a stripe in a RAID group; destaging the consolidated write request; and writing the destaged consolidated write request in a write out of place manner to one or more storage disk drives operating at the destage point of time in active state.

In accordance with further aspects of the presently disclosed subject matter, there is provided a computer program product comprising a computer useable medium having computer readable program code embodied therein of operating a RAID protected storage system which includes a control layer, the control layer including a cache memory and the control layer operatively coupled to a physical storage space including a plurality of storage disk units which each includes a plurality of storage disk drives, the computer program product comprising: computer readable program code for causing the computer to configure the plurality of storage disk units such that at any given point in time there are at least two storage disk drives operating in active state in any storage disk unit; computer readable program code for causing the computer to cache in the cache memory one or more write requests and generate a consolidated write request corresponding to a stripe in a RAID group; computer readable program code for causing the computer to destage the consolidated write request; and computer readable program code for causing the computer to write the destaged consolidated write request in a write out of place manner to one or more storage disk drives operating at the destage point of time in active state.

In accordance with further aspects of the presently disclosed subject matter, there is provided a program storage device readable by machine, tangibly embodying a program of instructions executable by the machine to perform a method of operating a system comprising a plurality of local storage disk drives which are remotely mirrored by a plurality of remote mirror storage disk drives, the method comprising: configuring the local storage disk drives so that at any given point in time, a part of the local storage disk drives operates in low power state, wherein the local storage disk drives are operable to switch between low power state and active state; and responsive to a read request for a portion on a local storage disk drive, reading from the local storage disk drive, if active; and if the local storage disk drive is not active, enquiring if a remote mirror storage disk drive storing a copy of the portion is active, and if yes, reading from the remote mirror storage disk drive.

In accordance with further aspects of the presently disclosed subject matter, there is provided a computer program product comprising a computer useable medium having computer readable program code embodied therein of operating a system comprising a plurality of local storage disk drives which are remotely mirrored by a plurality of remote mirror storage disk drives, the computer program product comprising: computer readable program code for causing the computer to configure the local storage disk drives so that at any given point in time, a part of the local storage disk drives operates in low power state, wherein the local storage disk drives are operable to switch between low power state and active state; and computer readable program code for causing the computer, responsive to a read request for a portion on a local storage disk drive, to read from the local storage disk drive, if active; and computer readable program code for causing the computer, if the local storage disk drive is not active, to enquire if a remote mirror storage disk drive storing a copy of the portion is active, and if yes, to read from the remote mirror storage disk drive.

BRIEF DESCRIPTION OF THE DRAWINGS

In order to understand the presently disclosed subject matter and to see how it can be carried out in practice, embodiments will now be described, by way of non-limiting example only, with reference to the accompanying drawings, in which.

DETAILED DESCRIPTION OF EMBODIMENTS

Figure 1:
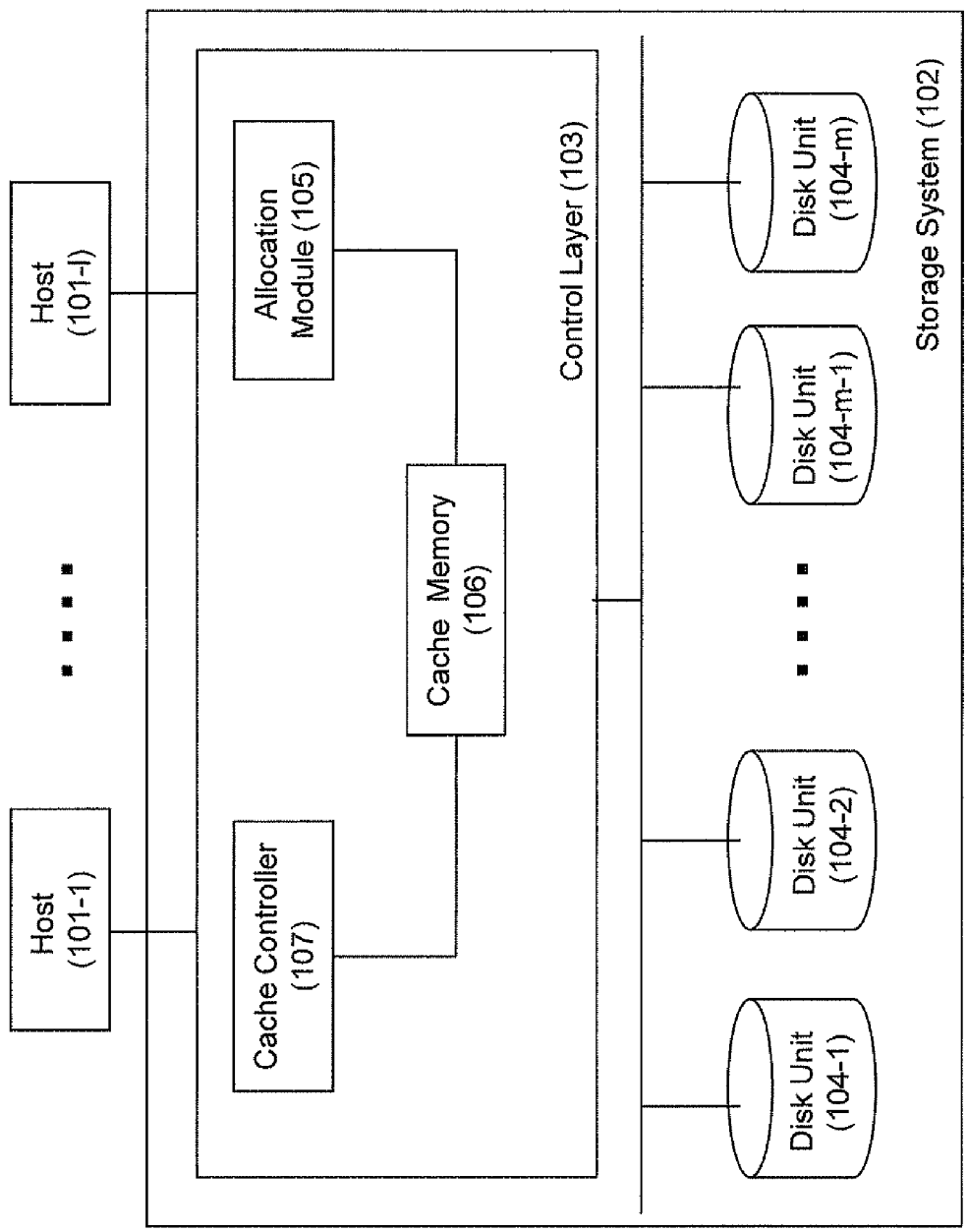
FIG. 1 illustrates a generalized functional block diagram of a mass storage system, in accordance with certain embodiments of the presently disclosed subject matter.

In the following detailed description, numerous specific details are set forth in order to provide a thorough understanding of the presently disclosed subject matter.

However, it will be understood by those skilled in the art that the presently disclosed subject matter can be practiced without these specific details. In other non-limiting instances, well-known methods, procedures, components and circuits have not been described in detail so as not to obscure the presently disclosed subject matter.

As used herein, the phrases "for example," "such as", "for instance", "e.g." and variants thereof describe non-limiting examples of the subject matter.

Unless specifically stated otherwise, as apparent from the following discussions, it is appreciated that throughout the specification discussions utilizing terms such as "processing", "computing", "calculating", "determining", "generating", "activating", "reading", "writing", "classifying", "allocating", "performing", "storing", "managing", "configuring", "caching", "destaging", "assigning", "associating", "transmitting", "enquiring" or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities, including, by way of non-limiting example, storage system and parts thereof disclosed in the present application.

The term criterion, parameter, or a variant thereof used in this patent specification should be expansively construed to include any compound criterion, parameter, or variant thereof, respectively, including, for example several criteria, parameters, or variants thereof respectively, and their logical combinations.

The operations in accordance with the teachings herein can be performed by a computer specially constructed for the desired purposes or by a general purpose computer specially configured for the desired purpose by a computer program stored in a computer readable storage medium.

Embodiments of the presently disclosed subject matter are not described with reference to any particular programming language. It will be appreciated that a variety of programming languages can be used to implement the teachings of the presently disclosed subject matter as described herein.

The references cited in the background teach many principles of operating a storage system that are applicable to the presently disclosed subject matter. Therefore the full contents of these published articles and patent applications are incorporated by reference herein where appropriate for suitable teachings of additional or alternative details, features and/or technical background.

In the drawings and descriptions, identical reference numerals are used for like components.

Bearing this in mind, attention is drawn to FIG. 1 illustrating an example of a storage system, in accordance with certain embodiments of the presently disclosed subject matter.

The plurality of host computers (workstations, application servers, etc.) illustrated as 101-1-101-L share common storage means provided by a storage system 102. The storage system comprises a storage control layer 103 comprising one or more appropriate storage control devices operatively coupled to the plurality of host computers, and a plurality of data storage devices (e.g. disk units 104-1-104-$m$) constituting a physical storage space optionally distributed over one or more storage nodes, wherein the storage control layer is operable to control interface operations (including I/O operations) there between. Optionally, the storage control layer can be further operable to handle a virtual representation of physical storage space and to facilitate necessary mapping between the physical storage space and its virtual representation. In embodiments with virtualization, the virtualization functions can be provided in hardware, software, firmware or any suitable combination thereof. Optionally, the functions of the control layer can be fully or partly integrated with one or more host computers and/or storage devices and/or with one or more communication devices enabling communication between the hosts and the storage devices. Optionally, a format of logical representation provided by the control layer can differ depending on interfacing applications.

The physical storage space can comprise any appropriate permanent storage medium and can include, by way of non-limiting example, one or more disk drives and/or one or more disk units (DUs), comprising several disk drives. Possibly, the DUs can comprise relatively large numbers of drives, in the order of 32 to 40 or more, of relatively large capacities, typically although not necessarily 1-2 TB. The storage control layer and the storage devices can communicate with the host computers and within the storage system in accordance with any appropriate storage protocol.

Stored data can be logically represented to a client in terms of logical objects. Depending on storage protocol, the logical objects can be logical volumes, data files, image files, etc. For purpose of illustration only, the following description is provided with respect to logical objects representing logical volumes. Those skilled in the art will readily appreciate that the teachings of the present subject matter are applicable in a similar manner to other logical objects.

A logical volume or logical unit (LU) is a virtual entity logically presented to a client as a single virtual storage device. The logical volume represents a plurality of data blocks characterized by successive Logical Block Addresses (LBA) ranging from 0 to a number LUK. Different LUs can comprise different numbers of data blocks, while the data blocks are typically although not necessarily of equal size (e.g. 512 bytes). Blocks with successive LBAs can be grouped into portions that act as basic units for data handling and organization within the system. Thus, by way of non-limiting instance, whenever space has to be allocated on a disk drive or on a memory component in order to store data, this allocation can be done in terms of data portions. Data portions are typically although not necessarily of equal size throughout the system (by way of non-limiting example, the size of data portion can be 64 Kbytes).

The storage control layer can be further configured to facilitate various protection schemes. By way of non-limiting example, data storage formats, such as RAID (Redundant Array of Independent Disks), can be employed to protect data from internal component failures by making copies of data and rebuilding lost or damaged data. As the likelihood for two concurrent failures increases with the growth of disk array sizes and increasing disk densities, data protection can be implemented, by way of non-limiting example, with the RAID 6 data protection scheme well known in the art.

Common to all RAID 6 protection schemes is the use of two parity portions per several data portions (e.g. using groups of four data portions plus two parity portions in a (4+2) protection scheme), the two parities being typically although not necessarily calculated by two different methods.

Under one known approach, all N consecutive data portions are gathered to form a RAID group, to which two parity portions are associated. The members of a group (including the data portions and the parity portions) are typically although not necessarily stored in separate drives. Under a second known approach, protection groups can be arranged as two-dimensional arrays, typically although not necessarily N*N such that data portions in any given line or column of the array are stored in separate disk drives. In addition, to every row and to every column of the array a parity portion can be associated. These parity portions are stored in such a way that the parity portion associated with a given column or row in the array resides in a disk drive where no other data portion of the same column or row also resides. Under both approaches, whenever data is written to a data portion in a group, the parity portions are also updated (e.g. using techniques based on XOR or Reed-Solomon algorithms). Whenever a data portion in a group becomes unavailable (e.g. because of disk drive general malfunction, or because of a local problem affecting the portion alone, or for any other reason), the data can still be recovered with the help of one parity portion via appropriate known in the art techniques. Then, if a second malfunction causes data unavailability in the same drive before the first problem was repaired, data can nevertheless be recovered using the second parity portion and appropriate known in the art techniques.

The storage control layer can further comprise an Allocation Module 105, a Cache Memory 106 operable as part of the IO flow in the system, and a Cache Control Module (aka Cache Controller) 107, that regulates data activity in the cache.

The allocation module, the cache memory and the cache control module can be implemented as centralized modules operatively connected to the plurality of storage control devices or can be distributed over a part or all storage control devices.

Typically although not necessarily, definition of LUs and/or other objects in the storage system can involve in-advance configuring an allocation scheme and/or allocation function used to determine the location of the various data portions and their associated parity portions across the physical storage medium. Sometimes, (e.g. in some cases of thin volumes or snapshots) the pre-configured allocation is only performed when, for the first time after definition of the volume, a write command is directed at a certain block or data portion in it.

An alternative known approach is a log-structured storage based on an append-only sequence of data entries. Whenever the need arises to write new data, instead of finding a formerly allocated location for it on the disk drive, the storage system appends the data to the end of the log. Indexing the data can be accomplished in a similar way (e.g. metadata updates can be also appended to the log) or can be handled in a separate data structure (e.g. index table).

Storage devices, accordingly, can be configured to support write-in-place and/or write-out-of-place techniques. In a write-in-place technique modified data is written back to its original physical location on the disk drive, overwriting the older data. In contrast, a write-out-of-place technique writes (e.g. in log form) a modified data block to a new physical location in the storage space (e.g. on a different disk drive). Thus, when data is modified after being read to memory from a location on a disk drive, the modified data is written to a new physical location so that the previous, unmodified version of the data is retained, but the reference to it is typically deleted, the storage space at that location therefore becoming free for reuse. A non-limiting example of the write-out-of-place technique is the known write-anywhere technique, enabling writing data blocks to any available disk drive without prior allocation.

The storage control layer defines a physical location(s) for writing the respective data (e.g. a location designated in accordance with an allocation scheme, preconfigured rules and policies stored in the allocation module or otherwise and/or location available for a log-structured storage). The time of definition can depend on the implementation, for instance occurring when receiving a write request, at the time of destage, etc. When receiving a read request from the host, the storage control layer identifies the physical location(s) of the desired data and further processes the request accordingly. The storage control layer can optionally issue updates to a given data object to all storage nodes which physically store data related to said data object. The storage control layer can optionally redirect the request/update to storage device(s) with appropriate storage location(s) irrespective of the specific storage control device receiving I/O request.

For purpose of illustration only, the operation of the storage system is described herein in terms of entire data portions. Those skilled in the art will readily appreciate that the teachings of the presently disclosed subject matter are applicable in a similar manner to partial data portions.

For purpose of illustration only, the following description is made with respect to RAID 6 architecture. Those skilled in the art will readily appreciate that the teachings of the presently disclosed subject matter relating to RAID protection are not bound by RAID 6 and are applicable in a similar manner to other RAID technology in a variety of implementations and form factors.

Figure 2:
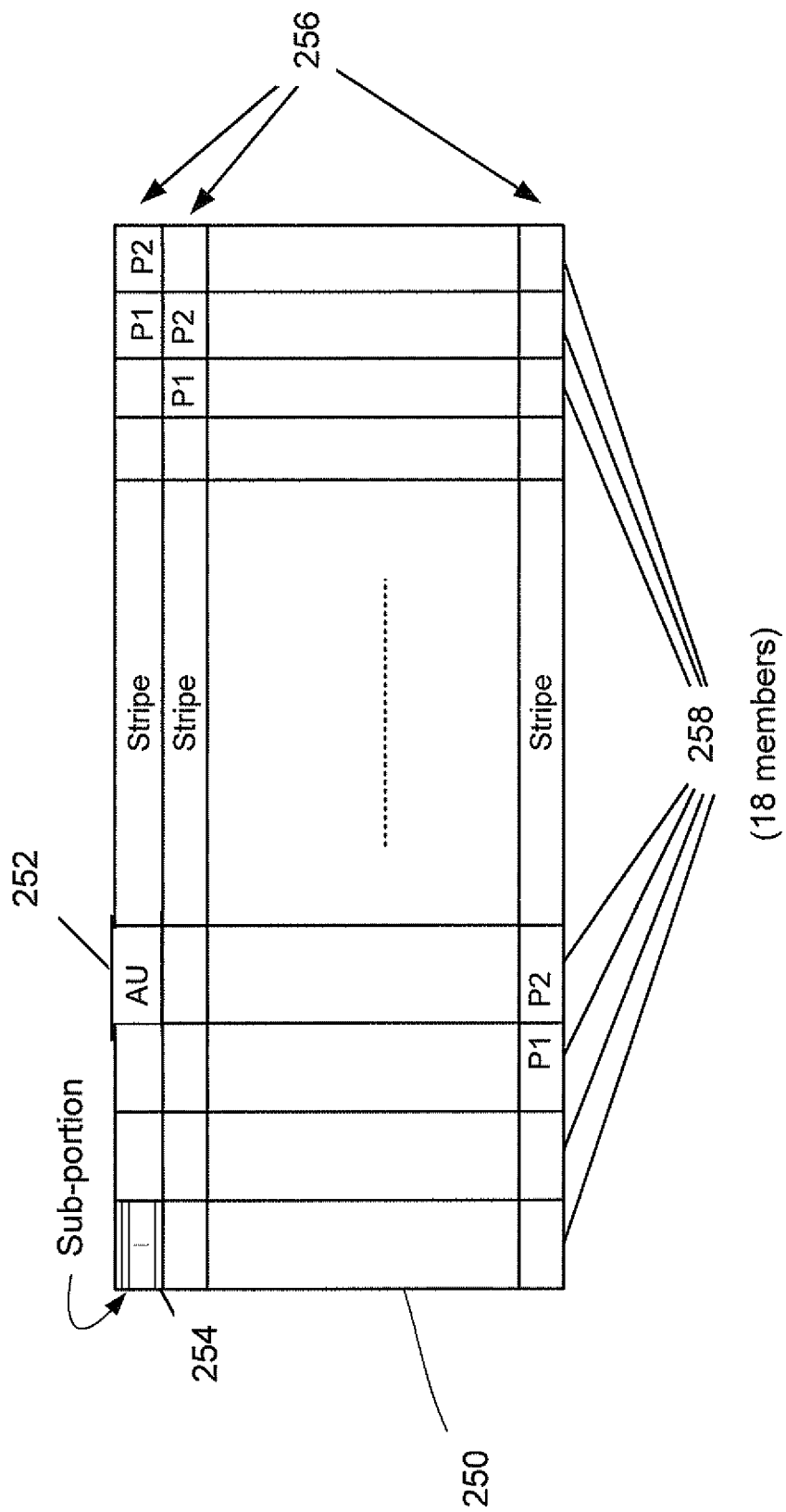
FIG. 2 illustrates a schematic diagram of storage space configured in RAID groups, in accordance with certain embodiments of the presently disclosed subject matter.

Referring to FIG. 2, there is illustrated a schematic diagram of storage space configured in RAID groups, in accordance with certain embodiments of the presently disclosed subject matter. A RAID group (250) can be built as a concatenation of stripes (256), the stripe being a complete (connected) set of data and parity elements that are dependently related by parity computation relations. In other words, the stripe is the unit within which the RAID write and recovery algorithms are performed in the system. A stripe comprises N+2 portions (252), where each portion is formed by the intersection of a stripe with a member (258) of the RAID group. A typical (although not necessary) size of a data portion is 64 KByte (or 128 blocks). In a non-limiting example with N=16, and with a typical (although not necessary) size of 4 GB for each group member, the data portions of the RAID group can typically although not necessarily comprise (4*16=) 64 GB of data. A typical (although not necessary) size of the RAID group, including the parity blocks, can be of (4*18=) 72 GB.

Accordingly, data that is going to be written to disk drives can be handled in terms of Raid Groups (RGs), each comprising stripes with N data portions and two parity portions (N=16 in this non-limiting example). The groups are divided into members and the members can be distributed via any suitable mapping and storage across the various disk drives in the system, by way of non-limiting example, as explained in U.S. patent application Ser. No. 13/008,197 filed on Jan. 18, 2011 assigned to the assignee of the current application and incorporated herein by reference in its entirety.

Figure 3:
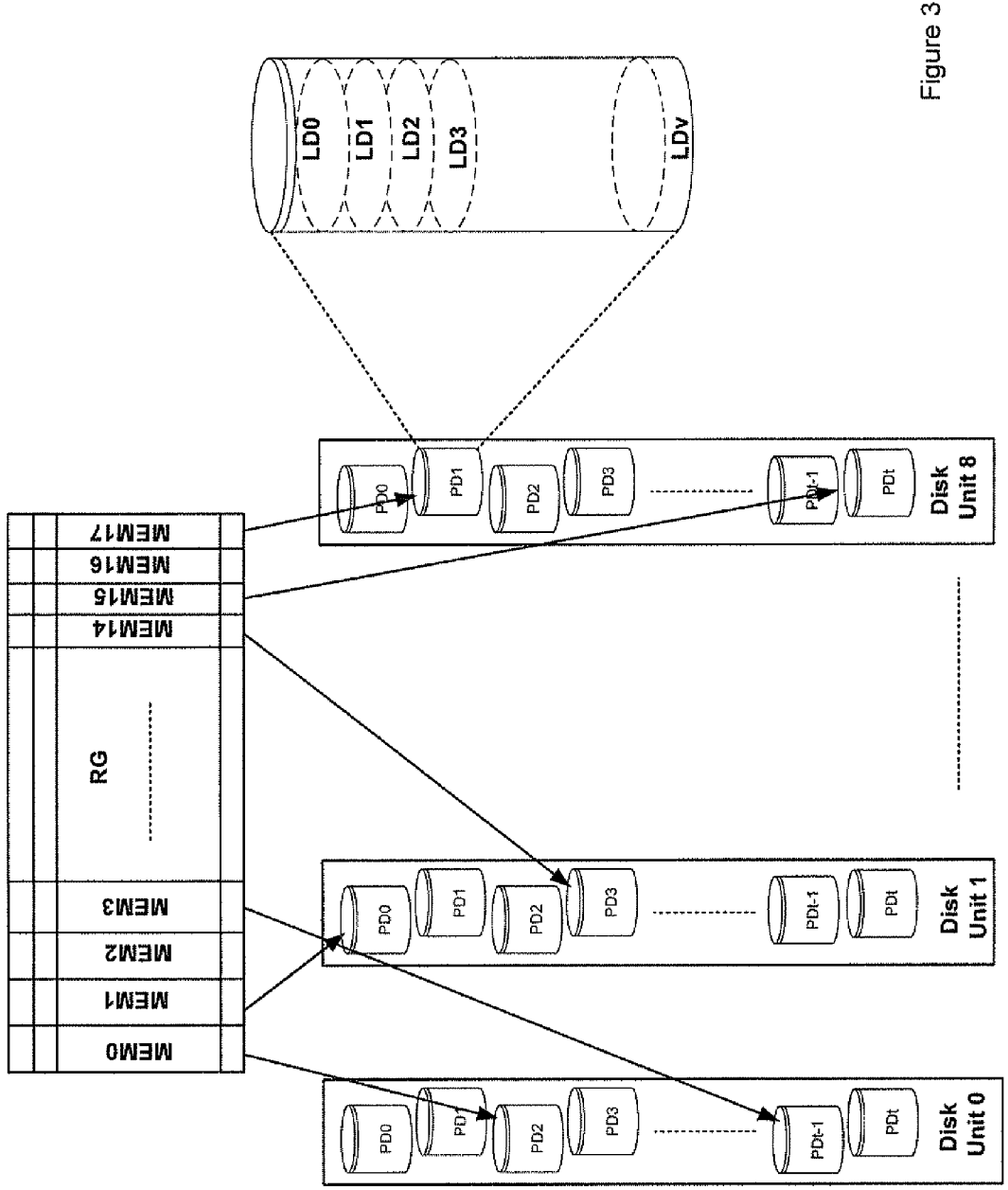
FIG. 3 illustrates the association between disk partitions and RAID group members, in accordance with certain embodiments of the presently disclosed subject matter.

Refer to FIG. 3, which illustrates the association between disk partitions and RAID group members, in accordance with certain embodiments of the presently disclosed subject matter. As illustrated in FIG. 3, the physical storage space can be arranged as a concatenation of RAID Groups (RGs), where each RG comprises N+2 members, $MEM_i$ ($0 \leq i \leq N+1$), with N being the number of data portions per RG (e.g. N=16.) The storage system is configured to allocate data (e.g. with the help of the allocation module 105) associated with the RAID groups over various physical drives. Moreover, the storage system can be arranged in terms of storage devices (or disk units DU) 104 (e.g. 104-1 to 104-*m*), each DU comprising physical disk drives, PD0 to PDt (e.g. 35-40 disk drives). Each PD can be logically divided into smaller, consecutive partitions, called disk partitions (LDs), here indicated as LD0 to LDv.

The size of the disk partitions (in terms of logical data blocks) is equal to that of the group members. For simplicity, assume the number of DUs to be nine, namely, half the numbers of members in a RG, in the illustrated non-limiting example. Let the pair (PDx, DUy) denote physical disk drive PDx within Disk Unit y, and the pair (MEMi,RGj) denote member i of RAID Group j. Now define an Energy Aware Assignment function EAA(MEMi,RGj) that assigns, to each group member MEMi of the RAID group RGj, a pair (PDx, DUy), namely, a physical disk drive within a given Disk Unit, in which the next available disk partition is associated with that member, as schematically represented in FIG. 3.

The function EAA can be defined as will be described further below, with the help of the following variables:

FLD (PDx, DUy,)—this is the list of free (aka available) disk partitions in (PDx, DUy,) at any given point in time.

ACTIVE (DUy)—this is a list of physical drives, PD, which at any given point in time are "active" in DUy. Drives can be added to or removed from this list, but in some non-limiting examples, it is configured that at least two different drives of any DU are active at any given point in time. When the storage system is started up, and assuming an implementation with two active disk drives per disk unit at start-up, the control layer (e.g. allocation module) can set the default list of active physical drives for all disk units as: ACTIVE (DUy) ={PD0, PD1}. Also, at this point, FLD (PDx DUy,) can be a non-empty list.

Alternatively or additionally, the control layer (e.g. allocation module) can configure the storage system so that for any disk unit at any point in time the ratio between active disk drives and disk drives operating in low power state in the same disk unit does not exceed a predefined parameter. In some cases the parameter is 10% to 30% but the disclosure does not impose limitations on this parameter which can vary depending on the implementation.

The writing to active disk drives in accordance with certain embodiments of the currently disclosed subject matter will now be described with reference to FIGS. 4-5.

Write requests described herein can originate from outside the storage system (e.g. from any of host computer(s) 101-1-101-L) and/or from background process(es) (e.g. defragmentation process, de-duplication process, compression process, scrubbing process, etc). In some embodiments, the Control Layer is operable to handle write requests relating to single data portions. Therefore, in these embodiments, if a write request originally related to more than one data portion, then the write request will be sub-divided into a plurality of write requests, each relating to a single data portion, and each will handled independently by the Control layer. Therefore when handling of a write request by the Control layer is discussed below, it should be understood that the write request referred to can be the original write request, or can be a write request which was sub-divided out of the original write request.

In a traditional approach when each write request is independently written to the cache, completing the write operation requires reading the parity portions already stored somewhere in the system and recalculating their values in view of the newly incoming data. Moreover, the recalculated parity blocks must also be stored once again. Thus, writing less than an entire stripe requires additional read-modify-write operations just in order to read-modify-write the parity blocks.

In accordance with certain embodiments of the presently disclosed subject matter, one or more write requests are combined, before destaging, in a manner enabling a direct association of the combined write request to an entire stripe within a RAID group. Accordingly, the two parity portions can be directly calculated within the cache before destaging, and without having to read any data or additional parity already stored in the disk drives.

Figure 4:
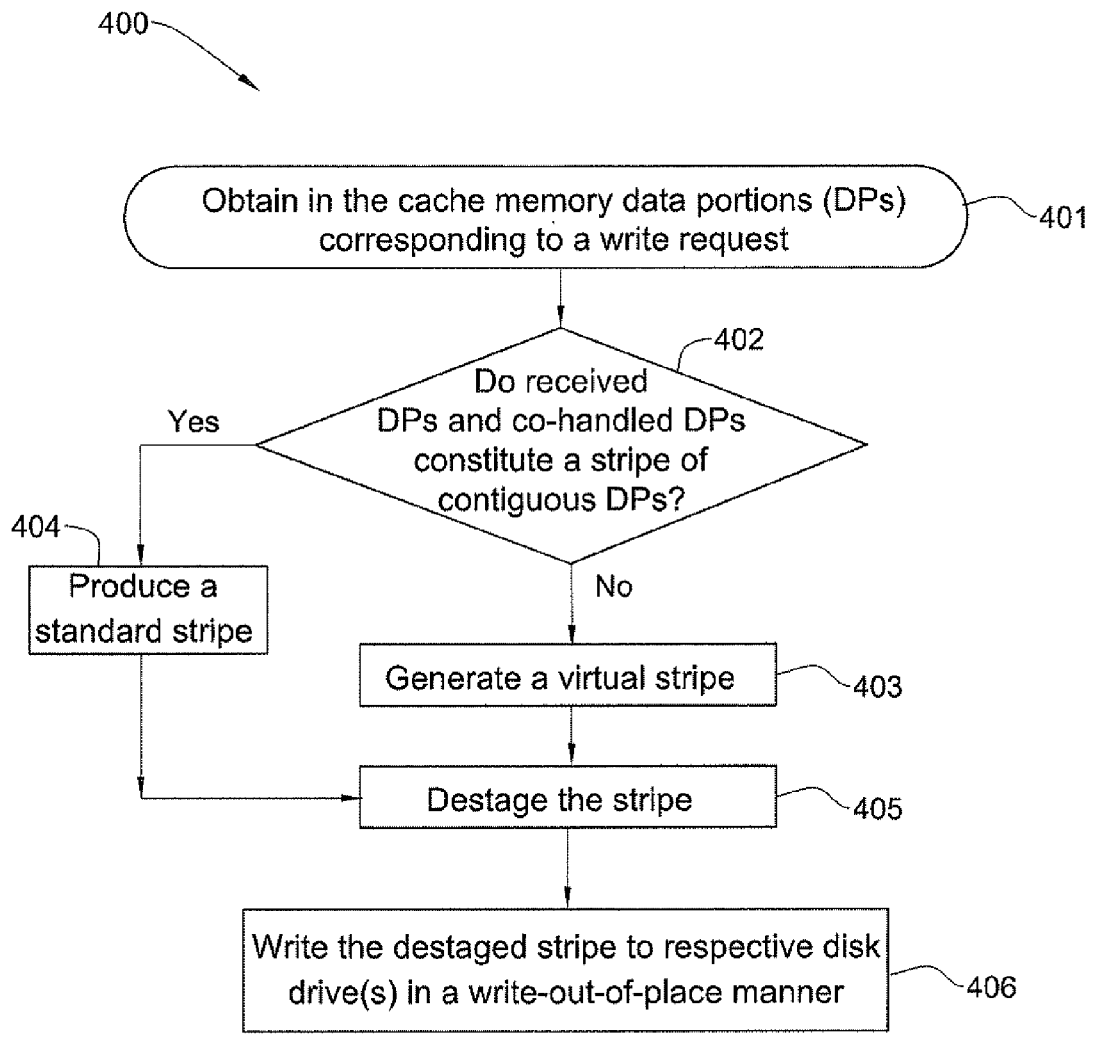
FIG. 4 is a generalized flow-chart of a method of handling a write request, in accordance with certain embodiments of the presently disclosed subject matter.

The storage system can operate as illustrated in FIG. 4 which is a generalized flow-chart of a method of handing a write request, in accordance with certain embodiments of the presently disclosed subject matter.

A write request is first written to a cache memory comprised in the control layer.

Upon obtaining (401) the write request in the cache memory, cache controller 107 (or other appropriate functional block in the control layer) analyses the succession (with regard to addresses, e.g. in the respective logical volume) of the data portion(s) corresponding to the obtained write request and data portions co-handled with the write request. The data portions co-handled with a given write request are constituted by data portions from write request(s) previously cached in the cache memory prior to the moment of obtaining the given write request in cache memory, and data portions from write request(s) later cached in the cache memory during a certain period of time after obtaining the given write request in the cache memory. The period of time can be pre-defined (e.g. 1 second) and/or adjusted dynamically according to a certain parameter (e.g. overall workload, level of dirty data in the cache, etc.) relating to the overall performance conditions in the storage system. Two data portions are considered as contiguous (aka sequential), if, with regard to addresses e.g. in the respective logical volume, data in one data portion precedes or follows data in the other data portion.

The cache controller analyses (402) if at least part of data portions in the obtained write request and at least part of co-handled data portions can constitute a group of N contiguous data portions, where N+P is the number of members of the RG (P is the number of parity portions, e.g. P=2).

If YES, the cache controller (404) groups respective data portions in the group of N contiguous data portions in a consolidated write request along with the P parity portions, thereby producing a ("standard") entire stripe of the RG.

If data portions in the obtained write request and co-handled data portions cannot constitute a group of N contiguous data portions (NO), where N is the number of data portions in the RG, the write request is handled in accordance with certain embodiments of the currently presented subject matter as disclosed below. The cache controller enables grouping (403) the cached data portions related to the obtained write request with co-handled data portions in a consolidated write request, thereby creating a virtual stripe comprising N data portions plus P parity portions. The virtual stripe is a concatenation of N data portions corresponding to the consolidated write request plus the P parity portions, wherein at least one data portion in the virtual stripe is non-contiguous with respect to all other data portions in the virtual stripe, and wherein the size of the virtual stripe is equal to the size of the stripe of the RAID group. A non-limiting example of a process of generating the virtual stripes is further detailed with reference to FIGS. 7-8.

Optionally, the virtual stripe can be generated to include data portions of a given write request and later cached write requests, while excluding data portions cached in the cache memory before obtaining the given write request in cache memory. Alternatively, the virtual stripe can be generated to include merely data portions of a given write request and data portions included in the cache memory before obtaining the given write request in cache memory.

Optionally, data portions can be combined in virtual stripes in accordance with pre-defined consolidation criterion. The consolidation criterion can be related expected I/O activities with regard to respective data portions and/or groups thereof. I/O activities can be related to any access requests addresses to respective data portions or to selected types of access requests. By way of non-limiting example, the I/O activities can be considered merely with regard to write requests addressed to respective data portions. Alternatively or additionally, the consolidation criterion can be related to different characteristics of data portions (e.g. source of data portions, frequency characteristics of data portion, type of data in data portions, succession of data portions with regard to addresses in the respective logical volume, and/or designated physical location, etc.).

The cache controller further enables destaging (405) the consolidated write request (e.g. as part of the destaging of one or more standard and/or virtual stripe(s) associated with an RG) and writing (406) the consolidated write request to active disk drive(s) in a write-out-of-place manner (e.g. in a log form aka as a log write). Thus, any data portion is part of a stripe associated with an RG, and that stripe can be either standard (if consolidated from a group of N contiguous data portions) or virtual (if not consolidated from a group of N contiguous data portions). Herein below, unless otherwise indicated, the term "stripe" can refer to a stripe which is virtual, or a stripe which is standard.

Figure 5:
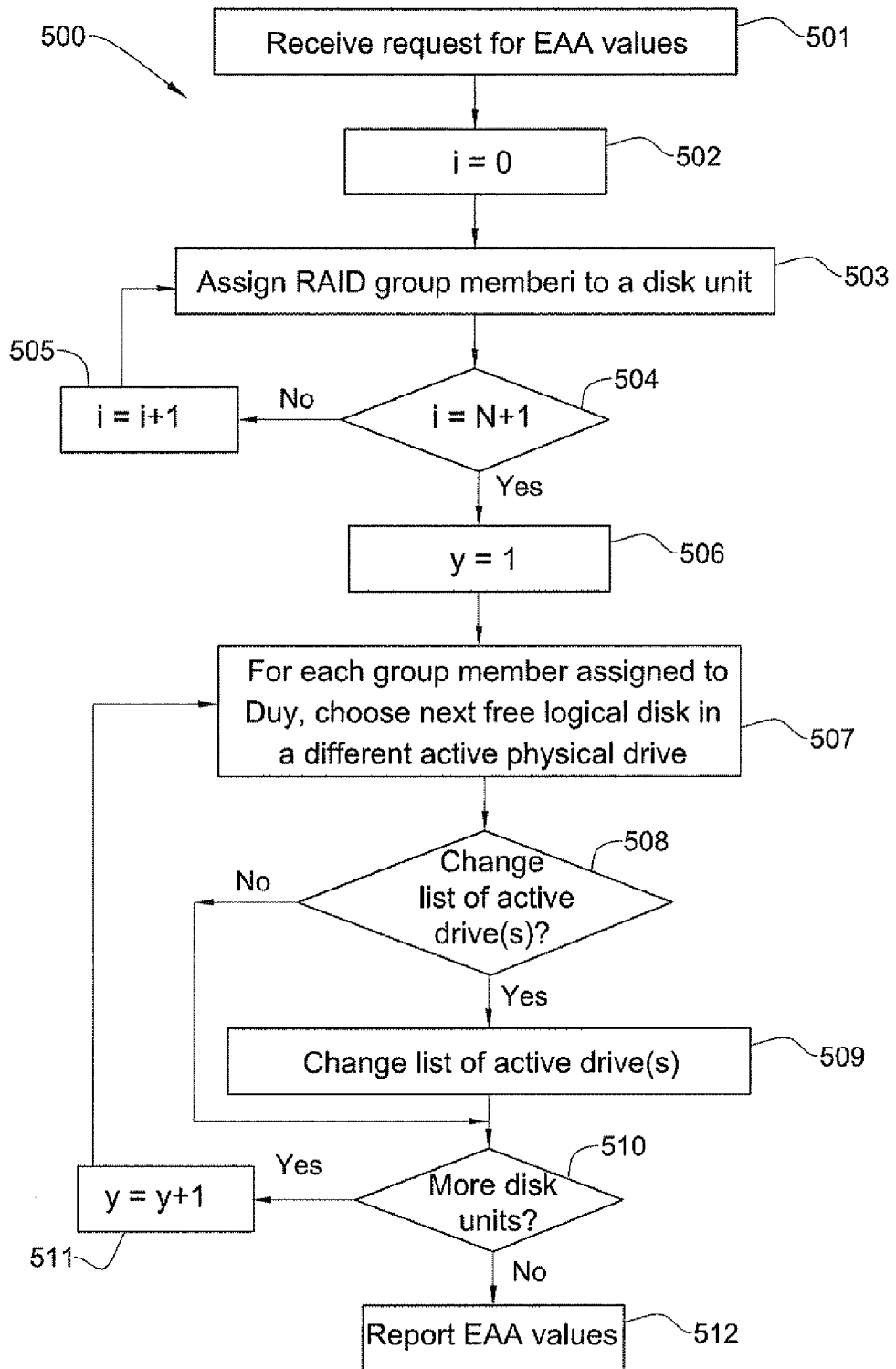
FIG. 5 is a generalized flowchart of a method of determining where to write consolidated write request(s), in accordance with certain embodiments of the presently disclosed subject matter.

FIG. 5 is a generalized flowchart of a method 500 of determining where to write consolidated write request(s), in accordance with certain embodiments of the presently disclosed subject matter. Method 500 can be applied, in a non-limiting example, each time that cache control module 107 (FIG. 1) decides that a RAID group, say RGj, is to be destaged. RGj is assumed to be associated with one or more stripes, each corresponding to a consolidated write request as described above with reference to FIG. 4.

Allocation module 105 receives (501) a message from cache controller 107 requesting the values of EAA(MEMi, RGj) (0≤i≤N+1).

Allocation module 105 assigns (502 to 505) each of the members of the RAID group to a disk unit. Any suitable assignment function can be used. In some embodiments, two members are assigned to each disk unit but in other embodiments this is not necessarily the case and even all members might be assigned to the same disk unit. In some of these embodiments the assignment proceeds according to modulo function: MEMi→DUy, with i≡y (mod 9) or in accordance with any other function which assigns two members to each disk unit. Assuming a non-limiting example where there are 18 group members and 9 disk units, two members can be assigned to each disk unit in these embodiments. In this example, let MEMi0, MEMi1 be the two members assigned to DU1. In some non-limiting cases, it can be advisable that the total number of active disk drives in the storage system equals N+2. If there are N+2 active disk drives, then in some of these cases a RAID 6 scheme can be properly applied. In some non-limiting cases, having at least two active drives in each disk unit adds reliability against a single point of failure if the disk unit fails. More specifically in non-limiting instances where not more than two members of a RAID6 group are assigned to a given disk unit, providing two active disk drives per disk unit can increase the likelihood that the protection scheme can be safely enforced in the system, there will be good load balance and a double point of failure will be avoided.

Within DUy, allocation module 105 chooses (506-507) an available disk partition (e.g. next available disk partition) in a different active physical disk drive for each assigned group member. By way of non-limiting example if two members MEMi0, MEMi1 were assigned to DU1, then two different elements in ACTIVE(DU1) would be used, say (PDx1, DU1), and (PDx2, DU1). Hence in this example: EAA(MEMi0, RGj)=(PDx1, DU1) and EAA(MEMi1,RGj)=(PDx2, DU1).

After assignment to disk partitions, allocation module 105 determines (508) if the list of active disk drives for DUy should be changed. In some non-limiting cases, the determination can be to remove a disk drive from the list of active disk drives if the list of free disk partitions for that disk drive is now empty. Continuing with the non-limiting example, it can be checked if FLD(PDx1, DU1) and/or FLD(PDx2, DU1) are now empty and if at least one is empty then 509 is performed, and if none is empty then 509 is skipped. In other non-limiting cases, the determination whether or not to change the list of active disk drives for DUy can additionally or alternatively be dependent on another criterion such as time since last change, balance considerations, duration of time that drive has already been active, performance, reliability, etc.

If it is determined to change the list of active disk drives, then allocation module 105 adds or substitutes (509) one or more disk drives to the active list for DUy. The selection of which disk drive(s) to add or substitute can be dependent on any criterion. By way of non-limiting instance, the selection can be based on the least recently used drive in DUy, activity per disk drive, etc. Depending on the embodiment, the selected disk drive(s) can substitute for disk drive(s) which are removed from the list of active disk drives, or can be added without removing disk drive(s) from the list. Therefore depending on the embodiment, the length of the list of active disk drives can be constant or variable, by way of non-limiting instance varying depending on considerations of performance, reliability, balance, etc. In some non-limiting cases, no disk drive can be removed from the active list unless it has been inactive for a period of time (PTT) that is either established in advance or dynamically modified according to the overall status of the storage system. In some of these cases, the value of PTT can be calculated to take into account various considerations, such as avoiding too frequent changes from active to low-power state and/or vice versa (since too many changes can produce wear off), reducing any negative impact on performance and/or reliability in the system, and/or other considerations known in the art. In other non-limiting cases, additionally or alternatively, a long term history of a disk drive can serve as a criterion for allowing or not allowing removal from the list. In some of these cases, the overall number of state changes from active to low power (and/or vice versa) (SCN) over a certain period of time (PERT) for which the condition is checked (e.g. last day, last week, last month), SCN(pert, DUy, PDx) can be compared to a predefined or dynamically adjusted threshold. In these cases, only if SCN(pert, DUy, PDx) is below the threshold, would PDx be allowed to be removed. Those versed in the art will identify other restrictive conditions on removing disk drives from the list that can additionally or alternatively apply here. Continuing with the non-limiting example, assume that PDx1 is removed from ACTIVE(DU1), and a new PD is added to ACTIVE(DU1), say PDx3. Still continuing with the example, PDx3 can be perhaps the least recently used drive in DU1.

Allocation module 105 determines (510-511) whether or not there are more disk units for which to perform 507-509. If yes, then method 500 iterates back to stage 507. Once there are no more disk units, allocation module 105 reports (512) the EAA values to cache controller 107. Method 500 then ends.

After the RAID group members have been assigned to disk partitions in accordance with the values returned by allocation module 105, cache controller 107, acting as the disk controller, can perform the destage cycle to the physical addresses of the indicated disk partitions.

It is noted that method 500, and especially the selection procedures described above, can in some non-limiting cases be enhanced by considerations based on long and short term statistic's, including those well known in the art, regarding the amount and types of activity in one or more disk drives, and in one or more disk units. It is also noted that the virtualized architecture described further below with reference to FIGS. 7-8, for instance the possibility of independent translation, can in some non-limiting cases enable additional flexibility in performing method 500, especially stages 503 and 507.

In some embodiments of the presently disclosed subject matter, cache controller 107, handles write requests and read requests simultaneously according to a criterion that prioritizes certain requests in relation to others, and thus regulates the IO activity in the system. At least part of this criterion can be related to reduction of energy consumption, e.g. with the help of one or more techniques known in the art.

Once cache controller 107 has completed the destage cycle for one of the RAID group, in a non-limiting example with the help of assignment procedure 500, cache controller 107 can move to a new task which can comprise a new destage cycle for another RAID group, or a read request directed at data found in the disk drives. In some embodiments, the system can be adapted to comply with the requirement of minimizing read requests addressed at low-power state disk drives.

The read requests described herein can originate from outside the storage system (e.g. from any of host computer(s) 101-1-101-L) and/or from background process(es) (e.g. defragmentation process, de-duplication process, compression process, scrubbing process, etc). In some embodiments, the Control Layer is operable to handle read requests relating to single portions. Therefore, in these embodiments, if a read request originally related to more than one portion, then the read request will be sub-divided into a plurality of read requests, each relating to a single portion, and each will handled independently by the Control layer. After each portion has been serviced, the portions can be reunited, in a non-limiting example prior to sending to the originator (e.g. host computer, background process, etc). Therefore when handling of a read request by the Control layer is discussed below, it should be understood that the read request referred to can be the original read request, or can be a read request which was sub-divided out of the original read request.

Figure 6:
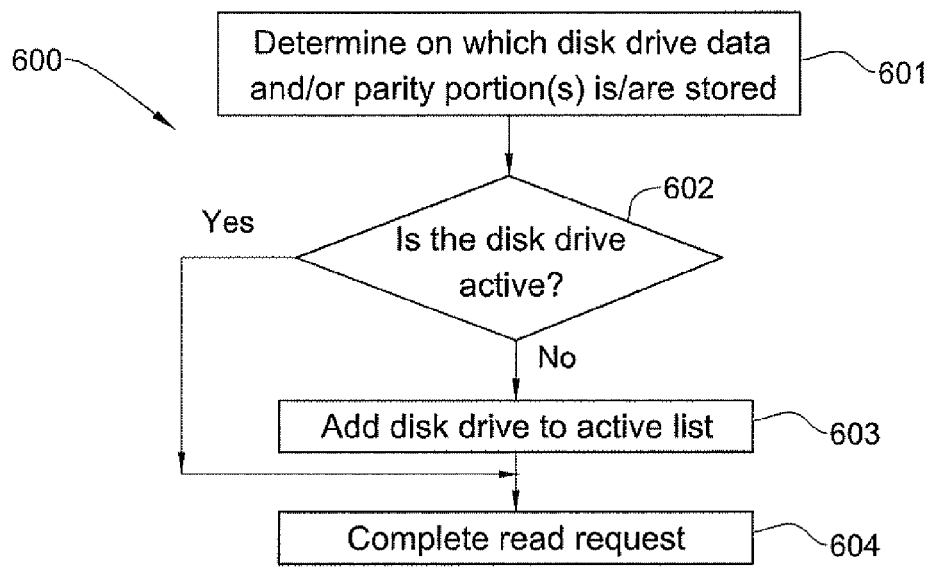
FIG. 6 is a generalized flowchart of a read method, in accordance with certain embodiments of the presently disclosed subject matter.

At some point cache controller 107 will need to read some data and/or parity portion(s) from a specific disk drive, say PDx in DUy. Thus, whenever a read task needs to be performed for a specific disk drive, the cache controller 107 can be adapted to implement a read method, by way of non-limiting example as illustrated in FIG. 6. FIG. 6 is a generalized flowchart of a read method, in accordance with certain embodiments of the presently disclosed subject matter.

Cache controller 107 determines (601) on which disk drive the portion to be read is stored.

Cache controller 107 determines (602) if that disk drive is currently active. By way of non-limiting instance, cache controller 107 can check if the disk drive, say PDx3, is in ACTIVE(DUy). If it is active, then method 600 omits stage 603 and proceeds directly to stage 604.

Otherwise, if the disk drive is not currently active, then in stage 603, allocation module 105 adds or substitutes the disk drive to the active list. By way of non-limiting instance PDx3 can be added to ACTIVE(DUy), either in addition to current members of ACTIVE(DUy), or substituting for one of the current members. Assuming substitution, the current member to be replaced (i.e. removed) from ACTIVE(DUy), say PDx4, can be selected according to any one or more criterion. By way of non-limiting example, PDx4 can be the active drive in DUy that has been least active since the last time the contents of ACTIVE(DUy) were updated. In one non-limiting example, there can additionally or alternatively be a restrictive condition that no disk drive is removed from ACTIVE (DUy), unless that disk drive has been inactive for a period of time PTT that is either established in advance or dynamically modified according to the overall status of the system. Note that the value of PTT can be calculated to take into account various considerations, such as (a) avoiding too frequent changes from active to low-power state and/or vice versa (since too many such changes produce wear-off), (b) reducing any negative impact on performance, (c) reducing any negative impact on reliability in the systems, and/or (d) any other suitable consideration(s). Additionally or alternatively, in another non-limiting example, the long term history of each disk drive can serve as a criterion for determining whether or not to allow removal of the disk drive from the ACTIVE (DUy) list. In this example the overall number of state changes from active to low-power over the certain period of time (and/or vice versa) (PERT) for which the condition is checked (e.g. last day, last week, last month, etc.) SCN(pert, DUy,PDx), can be compared to a predefined or dynamically adjusted threshold. In this example, only if SCN(pert, DUy, PDx) is below the threshold, would PDx be allowed to be removed. Those versed in the art will identify other restrictive conditions that can additionally or alternatively apply here.

Cache controller 107 completes (604) the read request by reading the portion from the disk drive. It is noted that sending a read request to the disk drive, in a non-limiting example via an SCSI command, will typically although not necessarily cause a disk drive which is in a low power state to become active. In some non-limiting cases, the newly active disk drive remains active until a predefined period of time has elapsed. In some of these non-limiting cases, after the predefined time period has elapsed the disk drive returns to its previous low power state. It is also noted that if the disk drive were already active, sending a read request would not affect the state of the disk drive.

In some other embodiments, step 603 can be performed in parallel or after step 604.

Method 600 then ends.

It is noted that method 600, and especially the selection procedures, can in some non-limiting cases be enhanced by considerations based on long and short term statistics regarding the amount and types of activity in one or more disk drives, and in one or more disk units. It is also noted that the virtualized architecture described further below with reference to FIGS. 7-8 can in some non-limiting cases enable additional flexibility in performing method 600.

It is noted that in some non-limiting cases between any two consecutive executions of method 500, method 600 can be performed one or more times. Thus the value of ACTIVE (DUy) can be modified one or more times between consecutive write operations. In some embodiments, the write operations can be controlled and will therefore tend to induce higher order and keep the same disk drives active, whereas the read requests will access disk drives according to necessity and will accordingly induce less order.

In accordance with certain of the embodiments described above, providing there are no more than two members of a RAID group assigned to a disk unit, the minimal number of active disk drives per a disk unit can be setup by default as equal to two. Also as described above, the minimal number of active disk drives per a disk unit can be more than two. The actual number of active disk drives per a disk unit can in some embodiments increase during the operation, and in a large mass storage system at any point in time the number members of ACTIVE(DUy) can be around 40-60% of the total number of disk drives per DU.

Figure 7:
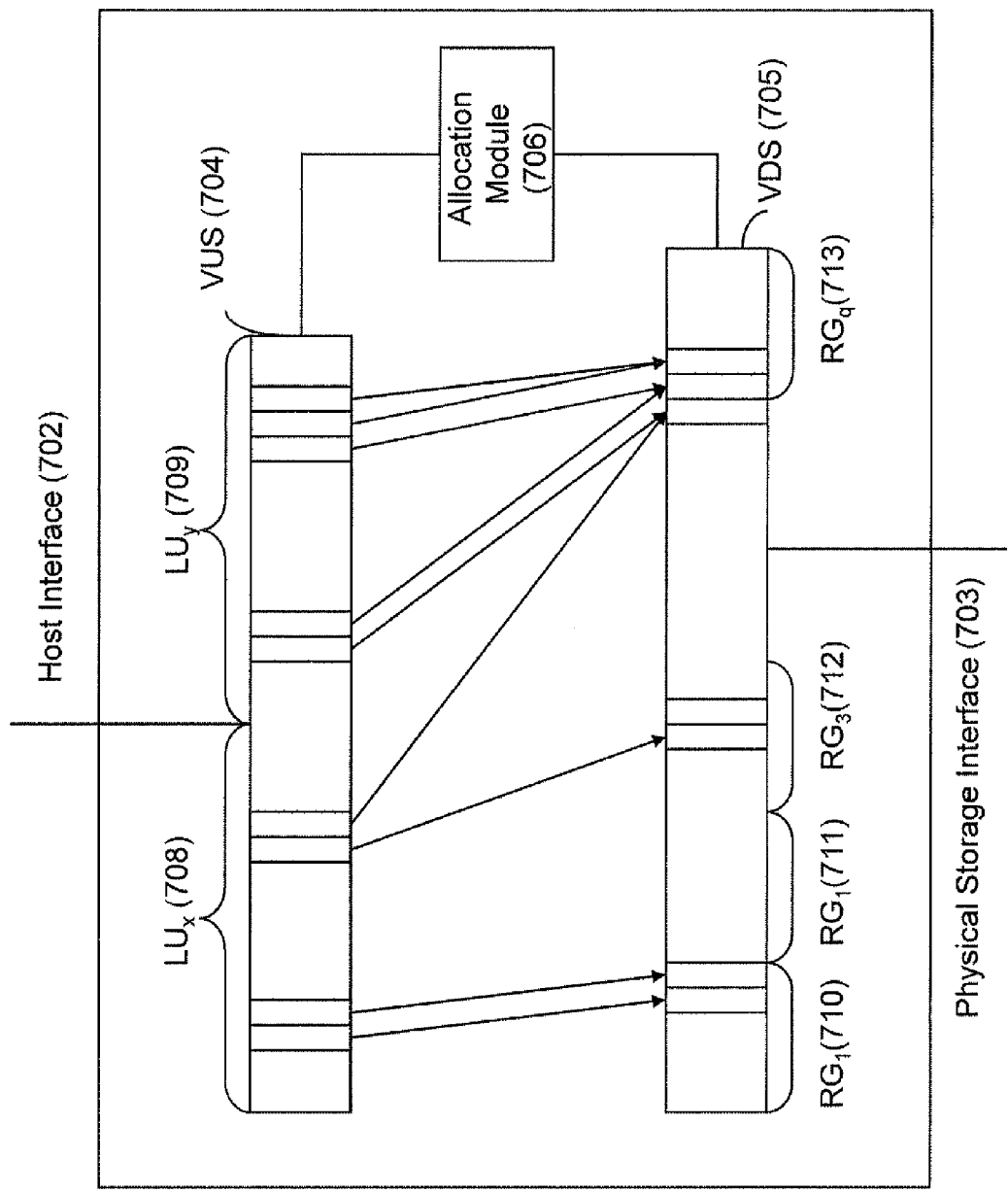
FIG. 7 illustrates a schematic functional diagram of the control layer in accordance with certain embodiments of the presently disclosed subject matter.

Some of the embodiments described herein can optionally be enhanced by a virtualized architecture which will now be described. Referring to FIG. 7, there is illustrated a schematic functional diagram of control layer 103 configured in accordance with certain embodiments of the presently disclosed subject matter. The illustrated configuration is further detailed in U.S. application Ser. No. 12/897,119 filed Oct. 4, 2010 assigned to the assignee of the present application and incorporated herewith by reference in its entirety.

The virtual presentation of the entire physical storage space is provided through creation and management of at least two interconnected virtualization layers: a first virtual layer 704 interfacing via host interface 702 with elements of the computer system (host computers, etc.) external to the storage system, and a second virtual layer 705 interfacing with the physical storage space via a physical storage interface 703. The first virtual layer 704 is operative to represent logical units available to clients (workstations, applications servers, etc.) and is characterized by a Virtual Unit Space (VUS). The logical units are represented in VUS as virtual data blocks characterized by virtual unit addresses (VUAs). The second virtual layer 705 is operative to represent the physical storage space available to the clients and is characterized by a Virtual Disk Space (VDS). By way of non-limiting example, storage space available for clients can be calculated as the entire physical storage space less reserved parity space and less spare storage space and/or less any other part of space which is not available to clients. Accordingly, the range of virtual addresses in VDS can correspond in this example to a certain portion (e.g. 70-80%) of the total physical storage space. The virtual data blocks are represented in VDS with the help of virtual disk addresses (VDAs). Virtual disk addresses are substantially statically mapped into addresses in the physical storage space. This mapping can be changed responsive to modifications of physical configuration of the storage system (e.g. by disk failure or disk addition). The VDS can be further configured as a concatenation of representations of RAID groups (RG), illustrated here as $RG_1$ (710) to RGq (713).

The first virtual layer (VUS) and the second virtual layer (VDS) are interconnected, and addresses in VUS can be dynamically mapped into addresses in VDS. The translation can be provided with the help of the allocation module 706 (which is a non-limiting example of allocation module 105) operative to provide translation from VUA to VDA via Virtual Address Mapping. By way of non-limiting example, the Virtual Address Mapping can be provided with the help of an address tree detailed in U.S. application Ser. No. 12/897,119 filed Oct. 4, 2010 and assigned to the assignee of the present application.

By way of non-limiting example, FIG. 7 illustrates a part of the storage control layer corresponding to two LUs illustrated as LUx (708) and LUy (709). The LUs are mapped into the VUS. Although not necessarily so, in a typical case, initially the storage system assigns to an LU contiguous addresses (VUAs) in VUS. However existing LUs can be enlarged, reduced or deleted, and some new ones can be defined during the lifetime of the system. Accordingly, the range of contiguous data blocks associated with the LU can correspond to non-contiguous data blocks assigned in the VUS. The parameter defining the request in terms of LUs is translated into a parameter defining the request in the VUAs, and a parameter defining the request in terms of VUAs is further translated into a parameter defining the request in the VDS in terms of VDAs and further translated into physical storage addresses.

In some embodiments, translating addresses of data blocks in LUs into addresses (VUAs) in VUS can be provided independently from translating addresses (VDA) in VDS into the physical storage addresses. Such translation can be provided, by way of non-limited examples, with the help of an independently managed VUS allocation table and a VDS allocation table handled in the allocation module 706. In some embodiments, different blocks in VUS can be associated with one and the same block in VDS, while allocation of physical storage space can be provided only responsive to destaging respective data from the cache memory to the disk drives (e.g. for snapshots, thin volumes, etc.).

Figure 8:
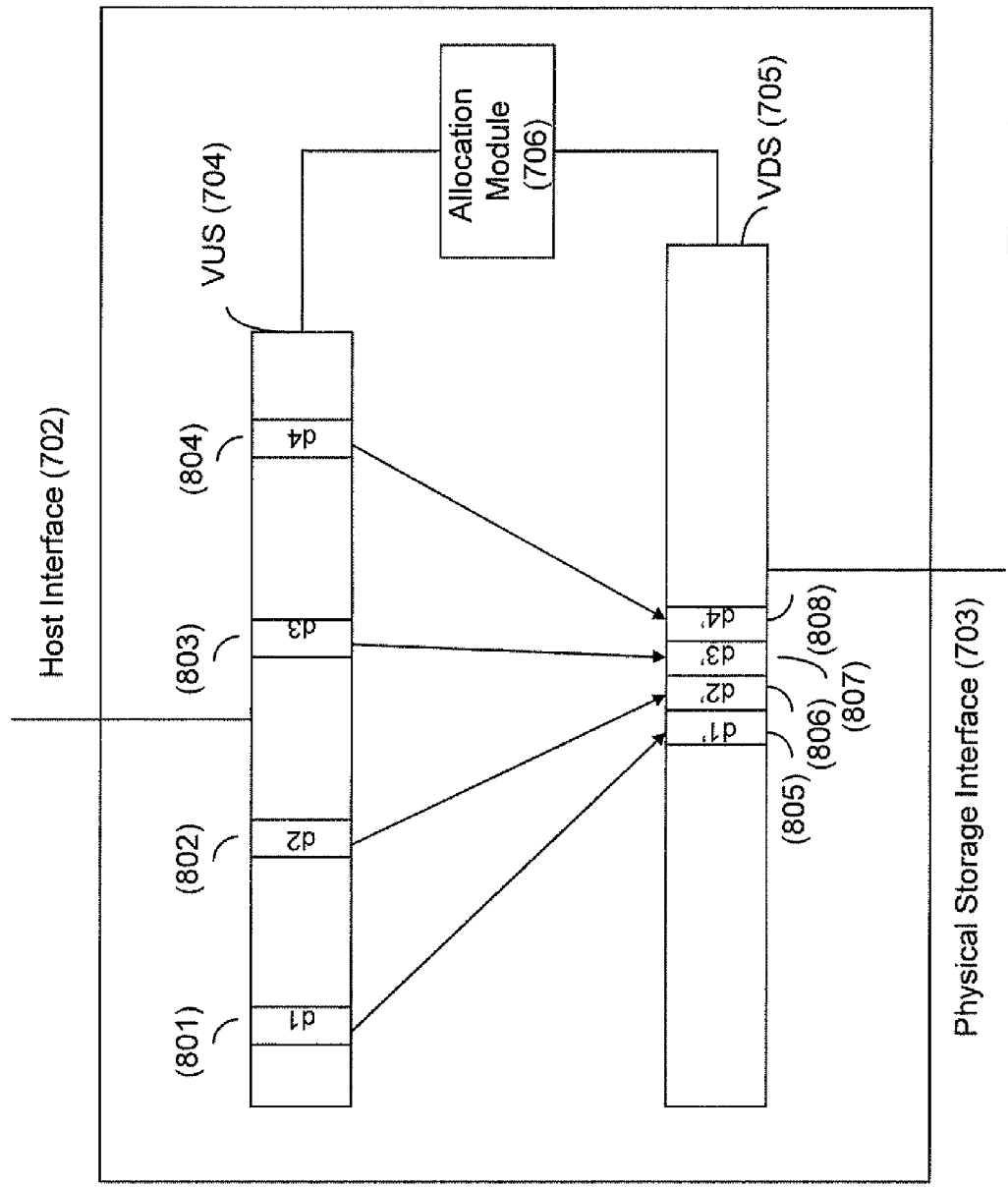
FIG. 8 illustrates a schematic diagram of generating a virtual stripe in accordance with certain embodiments of the presently disclosed subject matter.

Referring to FIG. 8, there is illustrated a schematic diagram of generating a virtual stripe with the help of the control layer illustrated in FIG. 7, in accordance with certain embodiments of the currently disclosed subject matter. As illustrated by way of non-limiting example in FIG. 8, non-contiguous data portions d1-d4 corresponding to one or more write requests are represented in VUS by non-contiguous sets of data blocks 801-804. VUA addresses of data blocks (VUA, block_count) correspond to the received write request(s) (LBA, block_count). The control layer further allocates to the data portions d1-d4 virtual disk space (VDA, block_count) by translation of VUA addresses into VDA addresses. When generating a virtual stripe comprising data portions d1-d4, VUA addresses are translated into sequential VDA addresses so that data portions become contiguously represented in VDS (805-808). When writing the virtual stripe to the disk drive, sequential VDA addresses are further translated into physical storage addresses of respective RAID group statically mapped to VDA. Write requests consolidated in more than one stripe can be presented in VDS as consecutive stripes of the same RG.

Likewise, the control layer illustrated with reference to FIG. 7 can enable recognizing by a background (e.g. defragmentation) process non-contiguous VUA addresses of data portions, and further translating such VUA addresses into sequential VDA addresses so that data portions become contiguously represented in VDS when generating a virtual stripe.

Thus, in accordance with certain embodiments of the presently disclosed subject matter as described above, the storage system can consolidate sequential (aka contiguous) data portions corresponding to write requests in one or more standard stripes, consolidate non-sequential data portions into one or more virtual stripes, and enable writing of each stripe as a respective log write. Consolidating non-sequential data portions into one or more virtual stripes can be provided in some embodiments with the help of mapping between the VUS and the VDS virtual layers. However, the two interconnected virtualization layers described with reference to FIGS. 7-8 are not necessarily required for all of the embodiments described above with reference to FIGS. 1-6.

In accordance with certain embodiments of the currently disclosed subject matter there can be two storage systems, a local storage system and a remote mirror storage system in communication with one another. The remote mirror storage system may have been set up in non-limiting examples in order to enable recovery in case of disaster, as a twin site and/or for any other reason.

Figure 9:
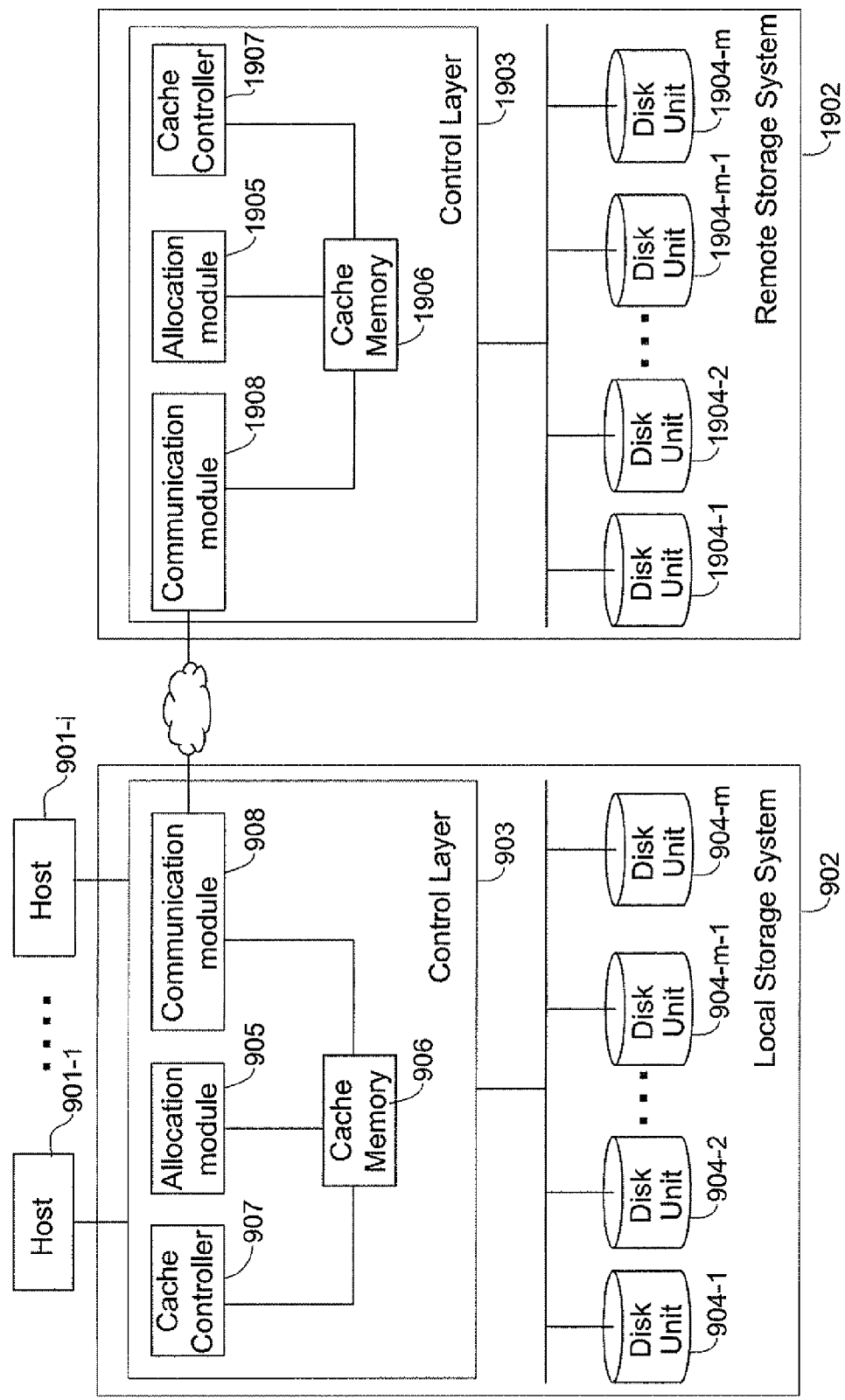
FIG. 9 illustrates a generalized functional block diagram of local and remote mirror storage systems, in accordance with certain embodiments of the presently disclosed subject matter.

Refer to FIG. 9 which illustrates local and remote systems in accordance with certain embodiments of the presently disclosed subject matter. For simplicity of description, it is assumed that the local storage system 902 is similar or identical to the storage system described with reference to FIGS. 1-3 and optionally with reference to FIGS. 7-8, except that in these embodiments the local storage system is necessarily operable to communicate with the remote mirror storage system whereas in the previous described embodiments, this feature is not necessary. Communication with the remote system can be performed in a non-limiting example by a communication module 908 in control layer 903 which is operable to communicate with the remote system via any appropriate connection. The connection can be provided via Wire-line, Wireless, cable, Internet, Intranet, power, satellite or other networks and/or using any appropriate communication standard, system and/or protocol and variants or evolution thereof (as, by way of non-limiting example, Ethernet, iSCSI, Fiber Channel, etc.). However, in some other embodiments, local storage system 902 is not necessarily similar or identical to the system described above with reference to FIGS. 1-3 and optionally with reference to FIGS. 7-8. For instance, in various non-limiting examples, local storage system 902 can or cannot be RAID protected, can or cannot be configured to perform method 400 and/or 500, etc.

For simplicity of illustration, remote mirror storage system 1902 is illustrated in FIG. 9 in a similar manner to the local storage system. However in certain embodiments, the configuration of the remote system can differ from the local system. For instance, in various non-limiting examples the remote system can or cannot be RAID protected even if the local system is RAID protected (or can or cannot be RAID protected even if the local system is not RAID protected), the remote system can or cannot allow disk drives to be in a low power state even if the local system does allow low power state (or the remote system can or cannot allow disk drives to be in low power state even if the local system does not allow low power state), the remote system can or cannot be configured to perform method 400 and/or 500 even if the local system is configured to perform method 400 and/or 500 (or the remote system can or cannot be configured to perform method 400 and/or 500 even if the local system is not configured to perform method 400 and/or 500), the remote system can or cannot handle data differently than the local system, etc. Therefore, in various embodiments, the attributes of a particular remote mirror storage system can vary as long as the remote system has at least one logical volume which mirrors a logical volume in the local storage system, meaning that a copy of data stored in that local logical volume is stored in the mirrored remote logical volume.

It is thus assumed that at least one of the volumes in a local storage system S 902 is/are mirrored in a remote minor storage system R 1902. Let LUi be a volume in the local storage system S, for which there is a remote mirroring volume, say LUi'. It is not necessary that all logical volumes in the local storage system S be mirrored in R, and in some non-limiting cases, one or more logical volumes in the local system S may be mirrored elsewhere than in remote system R and/or may not be mirrored at all. Similarly, it is not necessary that all volumes in remote mirror storage system R mirror volumes in local storage system S and in some non-limiting cases one or more logical volumes in the remote system may mirror volumes in other system(s) and/or may not mirror other volumes.

A write command originates from outside the local storage system (e.g. from any of host computer(s) 901-1-901-L) and is addressed to local logical volume(s), including say LUi, Optionally the original write request can be sub-divided, prior to being handled by the local control layer, and in this non-limiting case reference to a write request below relates a write request which was sub-divided out of the original write request.

The write request is written to the local cache 906. In embodiments with a remote minor storage system the write request is also communicated to the remote system, in a non-limiting instance by communication module 908. Remote mirroring can be implemented, by way of non-limiting example, by ways which are well-known in the art and which can be either synchronous or asynchronous. If synchronous, then once remote mirror storage system 1902 receives the write request, in a non-limiting instance by a communication module 1908 which is the remote counterpart of communication module 908, and writes the write request to a remote cache 1906, remote system 1902 acknowledges the transaction to local system 902 and the local system can acknowledge the transaction to the host 901. If asynchronous, local storage system 902 can acknowledge the transaction to the host once the write request is written to local cache 906, without necessarily first communicating the consolidated write request to remote storage system 1902.

Depending on the embodiment, local storage system 902 can handle the write request using any appropriate procedure(s), including or not including method 400 and/or 500. Depending on the embodiment, remote mirror storage system 1902 can handle the write request using any appropriate procedure(s), including or not including method 400 and/or 500.

It is noted that remote storage system 1902 services the write request using remote logical volume(s), including say LUi', which mirrors the local addressed is logical volume(s), including say LUi. However in accordance with certain embodiments of the presently disclosed subject matter, remote system R can handle LUi' according to its own internal considerations, and this means that the data portions that constitute LUi, in the local system, and the copies of these data portions that constitute LUi' in the remote, can possibly be handled differently at any point in time.

Thus by way of non-limiting instance, assuming that the local system is configured to work with energy saving mechanisms, if a read request is addressed at a certain portion of LUi in the local storage system, and that portion is currently in a disk drive which is in low-power state, it can well be the case that the copy of the portion in LUi' currently lies in an active disk drive in the remote mirror storage system (indeed, it can even be the case that the remote system is not even configured to work with energy saving mechanisms). In some embodiments, the local disk drives should be capable of transitioning between low power and active states. However in these embodiments this limitation is not necessarily applicable to the remote disk drives. Alternatively or additionally, in some embodiments, the remote disk drives should be capable of transitioning between low power and active states. However in these embodiments this limitation is not necessarily applicable to the local disk drives. Alternatively or additionally, in some embodiments, some of the remote disk drives and some of the local disk drives should be capable of transitioning between low power and active states, but not necessarily all of them.

Figure 10:
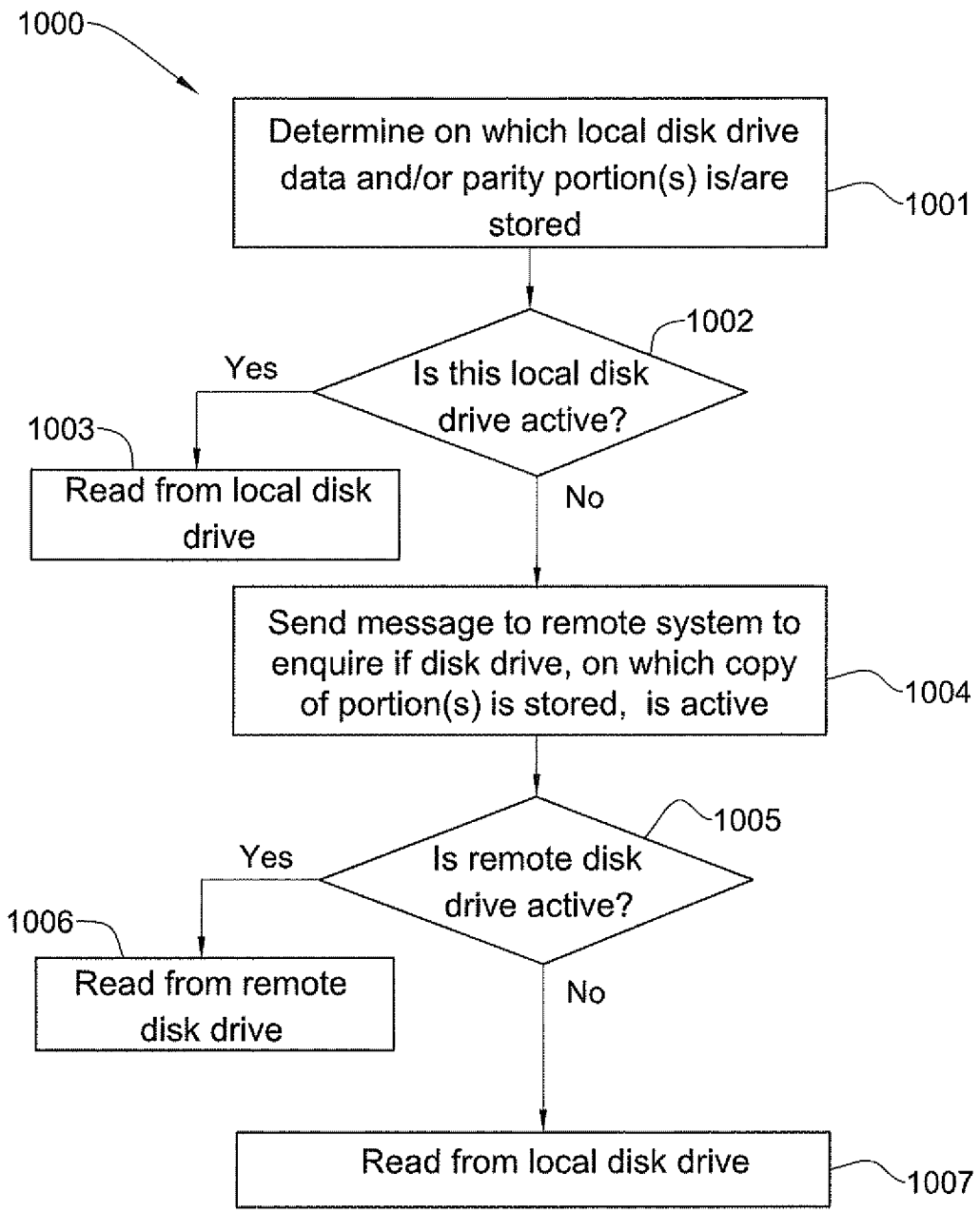
FIG. 10 is a generalized flowchart of a read method in a system with remote mirroring, in accordance with certain other embodiments of the presently disclosed subject matter.

In some embodiments with remote mirroring, read activity in disk drives which are currently in low-power state can be minimized thereby enabling reduced energy consumption. In some of these embodiments when cache 906 needs to fetch data and/or parity portion(s) in order to service some request, the cache control module 907 can proceed according to method 1000. FIG. 10 is a generalized flowchart of a read method 1000 in a system with remote mirroring, in accordance with certain other embodiments of the presently disclosed subject matter.

In some embodiments, the local Control Layer is operable to handle read requests relating to single portions. Therefore, in these embodiments, if a read request originally related to more than one portion, then the read request will be sub-divided into a plurality of read requests, each relating to a single portion, and each will handled independently by the Control layer. After each portion has been serviced, the portions can be reunited, in a non-limiting example prior to sending to the originator (e.g. host computer, background process, etc). Therefore when handling of a read request by the Control layer is discussed below, it should be understood that the read request referred to can be the original read request, or can be a read request which was sub-divided out of the original read request.

Local cache controller 907 determines (1001) on which disk drive in the local storage the portion to be read is stored.

Local cache controller 907 determines (1002) if that disk drive is currently active.

If the disk drive is active, then Cache controller 907 reads (1003) the portion from the local disk drive and method 1000 can end.

If the local disk drive is not active, then communication module 908 sends (1004) a message to the remote system (e.g. to remote communication module 1908) to enquire if the disk drive in the remote system on which a copy of the portion is stored is active.

If all the remote disk drives in the remote system are always active, then the remote system will answer 'yes'. If all the remote disk drives are not always active, then the remote system will determine if the disk drive on which the copy is stored is active, in a non-limiting instance by consulting a list of active remote disk drives. Remote system will then answer whether or not the remote disk drive is active.

If the remote disk drive is active, then if energy criterion is paramount, Local cache controller 907 will read (1006) the portion from the remote disk drive, putting the portion in cache 906 in the local system. The possibility of reading from the active remote disk drive in this non-limiting ease eliminates the need to read from the local disk drive when in low power state. However it is possible that in some embodiments Local cache controller will take into account another criterion, in a non-limiting instance, a criterion, such as performance criterion, and therefore not necessarily execute step 1006 and read from the remote disk drive simply because that disk drive is active. If 1006 has been performed, then method 1000 can end.

If the remote disk drive is also not active, then Local cache controller 907 reads (1007) the portion from the local disk drive. In some non-limiting cases, allocation module 905 can add or substitute the local disk drive to the local active list, e.g. similarly to as described in 603. Alternatively, there can be criterion which causes cache controller to read instead from the remote disk drive. If reading from the remote disk drive, then in some non-limiting cases allocation module 1905 can add or substitute the remote disk drive to the remote active list, e.g. similarly to as described in 603. It is noted that sending a read request to the remote or local disk drive which is in low power state, in a non-limiting example via an SCSI command, will typically although not necessarily cause that disk drive to become active. In some non-limiting cases, the newly active disk drive remains active until a predefined period of time has elapsed. In some of these cases, after the predefined time period has elapsed the disk drive returns to its previous low power state. After 1007 method 1000 can end.

Thus, in certain embodiments described herein there can be reduced energy consumption because write requests are directed to currently active disk drives and/or because reading from disk drives which are currently in low-power state is minimized. Additionally or alternatively, in a system configured in accordance with certain embodiments described herein, there can be a high level of data protection due to RAID protection and/or remote mirroring. Additionally or alternatively, in a system configured in accordance with certain embodiments described herein there can be a reduced frequency of switching disk drives from low power to active mode and therefore a reduced negative impact on performance.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

It is also to be understood that any of the methods described herein can include fewer, more and/or different stages than illustrated in the drawings, the stages can be executed in a different order than illustrated, stages that are illustrated as being executed sequentially can be executed in parallel, and/or stages that are illustrated as being executed in parallel can be executed sequentially. Any of the methods described herein can be implemented instead of and/or in combination with any other suitable power-reducing techniques.

It is also to be understood that certain embodiments of the presently disclosed subject matter are applicable to the architecture of storage system(s) described herein with reference to the figures. However, the presently disclosed subject matter is not bound by the specific architecture; equivalent and/or modified functionality can be consolidated or divided in another manner and can be implemented in any appropriate combination of software, firmware and hardware. Those versed in the art will readily appreciate that the presently disclosed subject matter is, likewise, applicable to any storage architecture implementing a storage system. In different embodiments of the presently disclosed subject matter the functional blocks and/or parts thereof can be placed in a single or in multiple geographical locations (including duplication for high-availability); operative connections between the blocks and/or within the blocks can be implemented directly (e.g. via a bus) or indirectly, including remote connection. The remote connection can be provided via Wireline, Wireless, cable, Internet, Intranet, power, satellite or other networks and/or using any appropriate communication standard, system and/or protocol and variants or evolution thereof (as, by way of non-limiting example, Ethernet, iSCSI, Fiber Channel, etc.). By way of non-limiting example, the presently disclosed subject matter can be implemented in a SAS grid storage system disclosed in U.S. patent application Ser. No. 12/544,734 filed on Aug. 20, 2009, assigned to the assignee of the present application and incorporated herein by reference in its entirety.

It is also to be understood that for simplicity of description, some of the embodiments described herein ascribe a specific step and/or task generally to storage control layer and/or more specifically to a particular module within the control layer.

However in other embodiments the specific step and/or task can be additionally or alternatively performed by one or more module(s) in the storage control layer, and not necessarily solely by the particular module.

It is also to be understood that the system according to the presently disclosed subject matter can be, at least partly, a suitably programmed computer. Likewise, the presently disclosed subject matter contemplates a computer program being readable by a computer for executing the method of the presently disclosed subject matter. The subject matter further contemplates a machine-readable memory tangibly embodying a program of instructions executable by the machine for executing a method of the subject matter.

Those skilled in the art will readily appreciate that various modifications and changes can be applied to the embodiments of the presently disclosed subject matter as hereinbefore described without departing from its scope, defined in and by the appended claims.

The invention claimed is:

1. A method of operating a storage system which includes a control layer, said control layer including a cache memory and said control layer operatively coupled to a physical storage space including a plurality of storage disk units which each includes a plurality of storage disk drives, the method comprising:
    configuring a plurality of storage disk drives of each storage disk unit such that at any given point in time, a first part of the plurality of storage disk drives of the storage disk unit operates in an active state and a second part of the plurality of storage disk drives of the storage disk unit operates in a low-power state;
    caching in the cache memory one or more data portions and generating a stripe that comprises the one or more data portions; and
    destaging said stripe, wherein the destaging of the stripe comprises:
    (i) assigning each data portion of the one or more data portions to a storage disk drive of the first part; and
    (ii) writing each data portion in a write out of place manner to a storage disk drive assigned to the data unit.

2. The method of claim 1 wherein the assigning comprises:
    dynamically assigning each data portion of the one or more data portions to a storage disk unit of the plurality of storage disk units; and
    associating each data portion assigned to said disk unit with a disk partition in a different storage disk drive of the first part;
    wherein said writing is to physical addresses corresponding to said disk partition.

3. The method of claim 1, wherein responsive to a read request for a portion on a storage disk drive, the method further comprises: reading from said storage disk drive.

4. The method of claim 1, wherein the control layer comprises at least two interconnected virtualization layers: a first virtual layer operative to represent logical units available to the clients and characterized by an Virtual Unit Space (VUS) and a second virtual layer operative to represent physical storage space available to the clients and characterized by a Virtual Disk Space (VDS); and wherein said generating of the stripe is provided with the help of translation of VUS addresses into sequential VDS addresses, said VDS addresses representing addresses assigned to the one or more data portions in the stripe.

5. The method of claim 1, wherein a ratio between a number of storage disk drives of a first part of a plurality of storage disk drives of a storage disk unit and a number of storage disk drives of a second part of the plurality of storage disk drives of the storage disk unit does not exceed a predefined parameter.

6. The method of claim 1, wherein said stripe comprises data portions whose logical addresses are not all sequential.

7. The method of claim 1, wherein said control layer and physical storage space are included in a local storage system, the method further comprising:
    transmitting said one or more data portions to a remote mirror storage system.

8. The method of claim 7, further comprising:
    responsive to a read request for a portion on a local storage disk drive, reading from said local storage disk drive, if active;
    if said local disk drive is not active, then enquiring from said remote mirror storage system whether a remote disk drive which stores a copy of said portion is active; and
    if said remote disk drive is active, then reading from said remote disk drive.

9. A storage system, comprising:
    a physical storage space including a plurality of storage disk units which each include a plurality of storage disk drives;
    a control layer including a cache memory, operatively coupled to said physical storage space, said control layer operable to:
        configure the plurality of storage disk drives of each storage disk unit such that at any given point in time a first part of the plurality of storage disk drives of the storage disk unit operates in an active state and a second part of the plurality of storage disk drives of the storage disk unit operates in a low-power state,
        cache one or more data portions and generate a stripe comprising the one or more data portions; and
        destage said stripe by: assign each data portion of the one or more data portions to a storage disk drive of the first part; and
        write each data portion in a write out of place manner to the storage disk drive.

10. The system of claim 9, wherein said control layer is operable to:
    dynamically assign each data portion of the one or more data portions to a storage disk unit of the plurality of storage disk units; and
    associate each data portion assigned to said storage disk unit with a disk partition in a different storage disk drive of the first part;
    wherein said data portion is written to a physical address corresponding to said disk partition.

11. The system of claim 9, wherein responsive to a read request for a portion on a storage disk drive, said control layer is operable to read from said storage disk drive.

12. The system of claim 9, wherein the control layer comprises at least two interconnected virtualization layers: a first virtual layer operative to represent logical units available to the clients and characterized by an Virtual Unit Space (VUS) and a second virtual layer operative to represent physical storage space available to the clients and characterized by a Virtual Disk Space (VDS); and wherein said generation of said stripe is provided with the help of translation of VUS addresses into sequential VDS addresses, said VDS addresses representing addresses assigned to the one or more data portions in the stripe.

13. The system of claim 9 wherein a ratio between a number of storage disk drives in a first part of a plurality of storage disk drives of a storage disk unit and a number of storage disk drives in the first part of the plurality of storage disk drives in the storage disk unit does not exceed a predefined parameter.

14. The system of claim 9, wherein said stripe comprises data portions whose logical addresses are not all sequential.

15. The system of claim 9, wherein said control layer and physical storage space are included in a local storage system, and wherein said control layer is further operable to:
- transmit said one or more data portions to a remote mirror storage system.

16. The system of claim 15, wherein said control layer is further operable to:
- responsive to a read request for a portion on a local storage disk drive,
  - read from said local storage disk drive, if active;
  - if said local disk drive is not active, enquire from said remote mirror storage system whether a remote disk drive which stores a copy of said portion is active; and
  - if said remote disk drive is active, read from said remote disk drive.

17. A non-transitory storage medium readable by machine, tangibly embodying a program of instructions executable by the machine to perform a method of operating a RAID protected storage system which includes a control layer, said control layer including a cache memory and said control layer operatively coupled to a physical storage space including a plurality of storage disk units which each includes a plurality of storage disk drives, the method comprising:
- configuring a plurality of storage disk units of each storage disk unit such that at any given point in time a first part of the plurality of storage disk drives of the storage disk unit operates in an active state and a second part of the plurality of storage disk drives of the storage disk unit operates in low-power state;
  - caching in the cache memory one or more data portions and generating a stripe, wherein the stripe comprises the one or more data portions; and
  - destaging said stripe, wherein the destaging comprises:
    - (i) assigning each data portion of the one or more data portions to a storage disk drive of a first part of a plurality of storage disk drives of a storage disk unit; and
    - (ii) writing each data portion in a write out of place manner to the storage disk drive assigned to the data unit.

18. A computer program product comprising a non-transitory storage medium having computer readable program code embodied therein of operating a storage system which includes a control layer, said control layer including a cache memory and said control layer operatively coupled to a physical storage space including a plurality of storage disk units which each includes a plurality of storage disk drives, the computer program product comprising:
- computer readable program code for causing the computer to configure a plurality of storage disk units of each storage disk unit such that at any given point in time a first part of the plurality of storage disk drives of the storage disk unit operates in an active state and a second part of the plurality of storage disk drives of the storage disk unit operates in a low-power state, computer readable program code for causing the computer to cache in the cache memory one or more data portions and generate a stripe comprising the one or more data portions; and
- computer readable program code for causing the computer to destage said stripe, the code for causing the computer to destage comprising:
  - (i) computer readable program code for causing the computer to assign each data portion of the one or more data portions to a storage disk drive of a first part of the plurality of storage disk drives of a storage disk unit; and
  - (ii) computer readable program code for causing the computer to write each data portion in a write out of place manner to the storage disk drive.

\* \* \* \* \*